United States Patent
Nagoya et al.

(10) Patent No.: US 8,572,759 B2
(45) Date of Patent: *Oct. 29, 2013

(54) COMMUNICATION MANAGEMENT SYSTEM AND COMMUNICATION MANAGEMENT METHOD

(75) Inventors: Mitsugu Nagoya, Tokyo (JP); Genta Iha, Tokyo (JP)

(73) Assignee: Duaxes Corporation, Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 12/438,660

(22) PCT Filed: Aug. 24, 2006

(86) PCT No.: PCT/JP2006/316648
§ 371 (c)(1),
(2), (4) Date: Dec. 16, 2009

(87) PCT Pub. No.: WO2008/023423
PCT Pub. Date: Feb. 28, 2008

(65) Prior Publication Data
US 2010/0107261 A1    Apr. 29, 2010

(51) Int. Cl.
*G06F 21/00* (2013.01)

(52) U.S. Cl.
USPC .......... 726/30; 726/22; 726/23; 726/24; 726/25; 726/26; 726/28; 726/29; 713/189; 713/190; 713/191; 713/192; 713/193; 713/194; 705/51; 705/52; 705/53; 705/54; 717/174; 717/175; 717/176; 717/177; 717/178

(58) Field of Classification Search
USPC ....................... 726/22, 23–25, 30
See application file for complete search history.

(56) References Cited

U.S. PATENT DOCUMENTS

| 7,624,446 | B1 * | 11/2009 | Wilhelm | 726/23 |
| 7,721,336 | B1 * | 5/2010 | Adjaoute | 726/25 |
| 7,748,040 | B2 * | 6/2010 | Adelstein et al. | 726/25 |

(Continued)

FOREIGN PATENT DOCUMENTS

| JP | 04-180425 | 6/1992 |
| JP | 09-218837 A | 8/1997 |

(Continued)

OTHER PUBLICATIONS

Castillo et al, Watermarking Strategies for RNS-based system Intellectual Property protection, Nov. 2-4, 2005.*

(Continued)

*Primary Examiner* — Andy Rao
*Assistant Examiner* — Shan Elahi
(74) *Attorney, Agent, or Firm* — Martin E. Hsia

(57) ABSTRACT

A communication management system includes: a normal signature list which stores a list of signatures of normal communication; a search circuit which acquires communication data and searches the normal signature list to check if the signature of the communication data appears in the list; and a warning unit which issues a warning when communication data does not match any signature in the normal signature list. An operator terminal includes: a determination result acquisition unit which indicates whether or not communication data against which a warning has been issued is normal; and a normal signature list update unit which, when communication data against which a warning has been issued is found to be normal, adds the signature of the communication data to the normal signature list.

4 Claims, 20 Drawing Sheets

(56) References Cited

U.S. PATENT DOCUMENTS

| | | | |
|---|---|---|---|
| 2007/0097976 A1* | 5/2007 | Wood et al. | 370/392 |
| 2007/0143841 A1* | 6/2007 | Kurakami et al. | 726/22 |
| 2007/0214501 A1* | 9/2007 | Muramoto et al. | 726/11 |

FOREIGN PATENT DOCUMENTS

| | | |
|---|---|---|
| JP | 2003-157190 A | 5/2003 |
| JP | 2004-030286 A | 1/2004 |
| JP | 2005-128933 A | 5/2005 |
| JP | 2005-267266 A | 9/2005 |
| JP | 2006-067605 A | 3/2006 |
| JP | 2006/114991 A | 4/2006 |
| JP | 2006/174374 A | 6/2006 |
| JP | 2006-178995 A | 7/2006 |
| JP | 2006-180280 A | 7/2006 |
| WO | 02/082750 A1 | 10/2002 |
| WO | 03/027858 A1 | 4/2003 |
| WO | 2004/114045 | 12/2004 |
| WO | 2005-527042 | 9/2005 |
| WO | 2006/043371 A1 | 4/2006 |

OTHER PUBLICATIONS

Farook Anjum et al, Signature based intrusion detection for wireless Ad-Hoc networks: A Comparative study of various routing protocols, Oct. 6-9 2003.*

Jia Zhang et al, A fast method of signature generation for polymorphic vorms, 2008.*

Masatomo et al, Autonomous traffic management by using an adaptive routing control, 2003.*

Vincent et al, A model for checking consistency in access control policies for network management, May 21, 2007.*

Yu et al, Multiple Tracking based anomaly detection of Mobile nodes, Nov. 15017 2005.*

Espacent search, Espacenet Result List, Feb. 2012.*

International Search Report w/translation from PCT/JP2006/316648 dated Nov. 28, 2006 (4 pages).

Masakazu Takahashi, "Behavioural Analysis of Botnet Based on Field Research," IPSJ Journal, (Japan: Information Processing Society of Japan, Aug. 15, 2006), vol. 47, No. 8, p. 2512-2523.

Yohei Ichishima, "Kigyou wo Atsukusuru Saishin Technology: Bot (The Latest Technology Heating Enterprises: Bot)," Nikkei Communications, (Japan: Nikkei Business Publications, Inc., Oct. 14, 2005), No. 448, p. 100-107.

"Delivering Coomplete Network Protection Using Advanced Content Processing Technology," White Paper, (Fortinet, Inc., May 2002), http://www.boll.ch/fortinet/assets/wp_cpt.pdf.

Japanese Office Action issued in the corresponding Japanese Patent Application No. 2007-513542 on Feb. 23, 2010, with its English-language translation.

Japanese Office Action issued in the corresponding Japanese Patent Application No. 2007-513543 on Feb. 23, 2010, with its English-language translation.

International Search Report (ISR) for corresponding PCT Application No. PCT/JP2006/316649, Feb. 28, 2008.

IPRP for corresponding PCT Application No. PCT/JP2006/316649, with English translation, Feb. 28, 2008.

IPRP for corresponding PCT Application No. PCT/JP2006/316648, with English translation, Feb. 28, 2008.

* cited by examiner

| URL |
|---|
| http://www.xxx.xxx/x5.html |
| http://www.xx.xx/******** |
| ⋮ |

| 62 | 64 |
|---|---|
| MATCHED | PERMIT |
| NOT MATCHED | DISCARD |

| 62 | 64 |
|---|---|
| 0 | PERMIT |
| 3 | DISCARD |
| 4 | REPLACEMENT |
| 7 | ROUTING |
| 8 | SWITCHING |
| ⋮ | ⋮ |

| APPARATUS ID | OPERATING STATE | USER ID |
|---|---|---|
| 1 | OPERATING | 000001~100000 |
| 2 | OPERATING | 100001~200000 |
| 3 | OPERATING | 200001~300000 |
| 4 | OPERATING | 300001~400000 |
| 5 | OPERATING | 400001~465183 |
| 6 | STANDBY | - |

| APPARATUS ID | OPERATING STATE | USER ID |
|---|---|---|
| 1 | OPERATING | 000001~100000 |
| 2 | FAILURE | - |
| 3 | OPERATING | 200001~300000 |
| 4 | OPERATING | 300001~400000 |
| 5 | OPERATING | 400001~465183 |
| 6 | OPERATING | 100001~200000 |

| APPARATUS ID | OPERATING STATE | USER ID |
|---|---|---|
| 1 | OPERATING | 000001~100000 |
| 2 | OPERATING | 100001~200000 |
| 3 | OPERATING | 200001~300000 |
| 4 | OPERATING | 300001~400000 |
| 5 | OPERATING | 400001~465183 |
| 6 | STANDBY | - |

FIG.21B

| APPARATUS ID | OPERATING STATE | USER ID |
|---|---|---|
| 1 | OPERATING | 000001~100000 |
| 2 | OPERATING | 100001~200000 |
| 3 | OPERATING | 200001~300000 |
| 4 | OPERATING | 300001~400000 |
| 5 | OPERATING | 400001~465183 |
| 6 | DATA UPDATING | 000001~100000 |

FIG.21C

| APPARATUS ID | OPERATING STATE | USER ID |
|---|---|---|
| 1 | STANDBY | - |
| 2 | OPERATING | 100001~200000 |
| 3 | OPERATING | 200001~300000 |
| 4 | OPERATING | 300001~400000 |
| 5 | OPERATING | 400001~465183 |
| 6 | OPERATING | 000001~100000 |

COMMUNICATION MANAGEMENT SYSTEM AND COMMUNICATION MANAGEMENT METHOD

TECHNICAL FIELD

The present invention relates to a communication management technique, and particularly to a communication management system and a communication management method for managing inappropriate communication.

BACKGROUND ART

Due to improved Internet infrastructures and the widespread of communication terminals, such as cellular phone terminals, personal computers, and VoIP (Voice over Internet Protocol) phone sets, the number of Internet users is now exploding. Under such circumstances, security problems such as computer viruses, hacking and spam mails have become apparent, requiring appropriate techniques for communication control. Also, since improved communication environments have enormously increased communication traffic, there are required communication control apparatuses that enable high-speed processing of a large volume of data.
[Patent Document 1] Japanese Patent Application Laid-open No. 4-180425.

DISCLOSURE OF THE INVENTION

Problem to be Solved by the Invention

In recent years, there have been found malicious programs (malware) that are primarily intended to infect computers to damage them or to use such computers as zombie computers for sending spam mails or performing DDoS attacks, and such programs are regarded as a serious issue. These malicious programs are called "bots", and since a bot operates according to external instructions, an infected computer can be manipulated from the outside through a bot. Moreover, if a number of computers are infected by the same bot, such computers can be operated simultaneously under a single instruction, which may cause severe damage.

It is difficult to rely on antivirus software or the like to detect a bot, because new bot variants are created constantly. In addition, attackers are able to use their own protocols to give instructions for operating bots, thereby making the detection of bots more difficult.

The present invention has been made in view of such a situation, and a general purpose thereof is to provide a technique for managing inappropriate communication.

Means for Solving the Problem

One aspect of the present invention relates to a communication management system. The communication management system comprises: a normal signature list which stores a list of signatures of normal communication; a first search unit which acquires communication data and searches the normal signature list storing signatures of normal communication to check if the signature of the communication data appears in the list; and a warning unit which issues a warning when there is detected communication data of which the signature does not match any signature of normal communication stored in the normal signature list.

The communication management system may further comprise: a determination result acquisition unit which acquires a determination result indicating whether or not communication data against which a warning has been issued is normal; and a normal signature list update unit which, when the determination result acquisition unit acquires a determination result that communication data against which a warning has been issued is found to be normal, adds the signature of the communication data to the normal signature list.

The communication management system may further comprise: an abnormal signature list which stores a list of signatures of communication to be blocked; a second search unit which acquires communication data and searches the abnormal signature list storing signatures of communication to be blocked to check if the signature of the communication data appears in the list; and a blocking unit which, when there is detected communication data of which the signature matches a signature of communication to be blocked stored in the abnormal signature list, blocks the communication data.

The determination result acquisition unit may further acquire a determination result indicating whether or not communication data against which a warning has been issued should be blocked. The communication management system may further comprise an abnormal signature list update unit which, when the determination result acquisition unit acquires a determination result that communication data against which a warning has been issued should be blocked, adds the signature of the communication data to the abnormal signature list.

The communication management system may further comprise: a rule database which stores a rule for extracting communication data required to be analyzed among acquired communication data; a third search unit which acquires communication data and searches the rule database to check if the communication data complies with a rule stored in the database; and an extraction unit which, when there is detected communication data complying with a rule stored in the rule database, extracts the communication data.

The communication management system may further comprise a rule database update unit which adds, to the rule database, a rule for extracting communication data associated with communication data against which a warning has been issued.

At least two of the first search unit, the second search unit and the third search unit may be configured with FPGAs (Field Programmable Gate Array) or wired logic circuits. Also, at least two of the first search unit, the second search unit and the third search unit may perform searches simultaneously in parallel.

Another aspect of the present invention relates to a communication management method. The communication management method comprises: searching, upon acquisition of communication data, a normal signature list storing a list of signatures of normal communication so as to check if the signature of the communication data appears in the list; and issuing a warning when there is detected communication data of which the signature does not match any signature of normal communication stored in the normal signature list.

Optional combinations of the aforementioned constituting elements, and implementations of the invention in the form of methods, apparatuses, systems, recording mediums and computer programs may also be practiced as additional modes of the present invention.

Advantageous Effects

The present invention provides a technique for managing inappropriate communication.

BRIEF DESCRIPTION OF THE DRAWINGS

FIG. 6 is a diagram that shows another example of the position detection circuit.

FIG. 7 is a diagram that shows yet another example of the position detection circuit.

FIG. 14 is a diagram that shows still yet another example of internal data of the first database.

FIG. 15 is a diagram that shows an example of internal data of a second database.

FIG. 16 is a diagram that shows another example of internal data of the second database.

FIG. 19 is a diagram that shows an example of internal data of a management table provided in an operation monitoring server.

FIG. 20 is a diagram for describing an operational procedure performed in the event that a communication control apparatus fails.

FIGS. 21A, 21B and 21C are diagrams for describing a procedure for updating databases in the communication control apparatuses.

Figure 1:
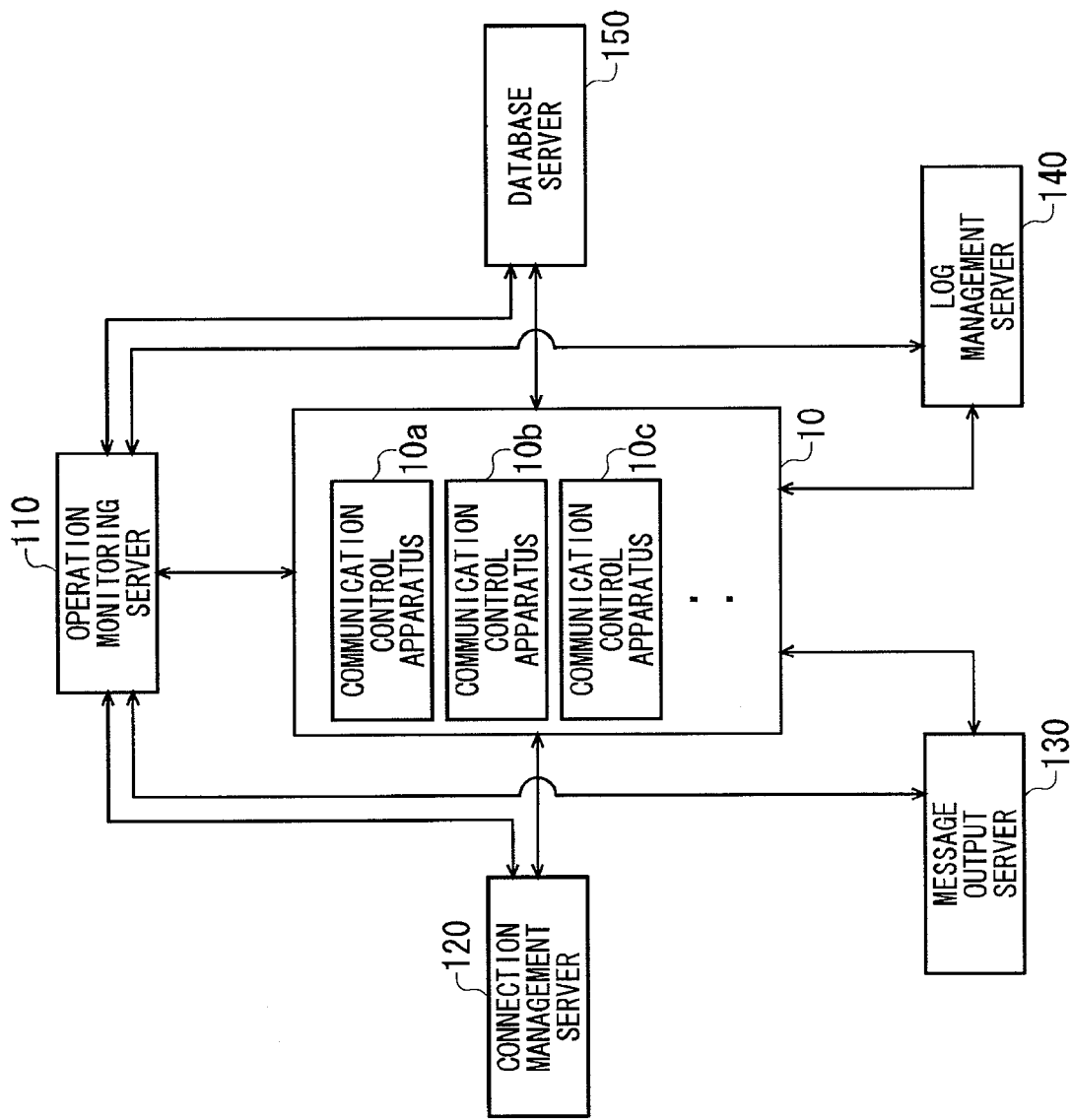
FIG. 1 is a diagram that shows a configuration of a communication control system according to a base technology.

EXPLANATION OF REFERENCE NUMERALS 10 communication control apparatus
20 packet processing circuit
30 search circuit
32 position detection circuit
33 comparison circuit
34 index circuit
35 comparison circuit
36 binary search circuit
36A, 36B and 36C comparison circuits
36Z control circuit
40 process execution circuit
50 first database
60 second database
100 communication control system
110 operation monitoring server
120 connection management server
130 message output server
140 log management server
150 database server
200 communication path control apparatus
300 communication management system
310 user terminal
320 bot
322 botnet
332 normal signature list
334 abnormal signature list
336 rule database
340 operator terminal
342 warning acquisition unit
344 communication data acquisition unit
346 analysis unit
348 determination result acquisition unit
352 normal signature list update unit
354 abnormal signature list update unit
356 rule database update unit
362 normal signature list
364 abnormal signature list
366 rule database
390 Internet

BEST MODE FOR CARRYING OUT THE INVENTION

First, as a base technology, a communication control system that has no CPU or OS and performs a packet filtering function using a dedicated hardware circuit will be described. Thereafter, there will be described as an embodiment a technique for managing communication in a botnet using the communication control system of the base technology.

(Base Technology)

FIG. 1 shows a configuration of a communication control system according to the base technology. A communication control system 100 comprises a communication control apparatus 10 and various peripheral apparatuses provided to support the operation of the communication control apparatus 10. The communication control apparatus 10 of the base technology performs a packet filtering function provided by an Internet service provider or the like. The communication control apparatus 10 provided on a network path acquires a packet transmitted via the network, analyzes the content, and determines whether or not the packet communication should be permitted. If the communication is permitted, the communication control apparatus 10 will transmit the packet to the network. If the communication is prohibited, the communication control apparatus 10 will discard the packet and return a warning message or the like to the transmission source of the packet if necessary.

The communication control system 100 of the base technology includes multiple communication control apparatuses 10a, 10b, 10c, etc. and operates them functioning as one communication control apparatus 10. Hereinafter, each of the communication control apparatuses 10a, 10b, 10c, etc. and their collective body will be both referred to as a communication control apparatus 10 with no distinction.

In the communication control system 100 of the base technology, each communication control apparatus 10 stores the respective shares of at least part of databases necessary for packet processing; there are provided as many as the number of communication control apparatuses 10 required to share and store such databases, and at least one more apparatus is provided extra. For example, when the number of pieces of data is 300,000 or above but less than 400,000, the number of communication control apparatuses required for operation is four. However, one or more communication control apparatuses 10 should be further provided as standby units in case any of the communication control apparatuses 10 in operation fails or in case a database in any of the communication control apparatuses 10 is updated. Accordingly, at least five communication control apparatuses 10 are provided in total. Conventionally, the entire system has needed to be duplexed considering fault tolerance. According to the technique of the base technology, in contrast, a divided unit of the communication control apparatus 10 may be only provided extra, thereby enabling cost reduction. The operating state of the multiple communication control apparatuses 10a, 10b, 10c, etc. is managed by an operation monitoring server 110. The operation monitoring server 110 of the base technology has a management table for managing the operating state of the communication control apparatuses.

The peripheral apparatuses include the operation monitoring server 110, a connection management server 120, a message output server 130, a log management server 140 and a database server 150. The connection management server 120 manages connection to the communication control apparatus 10. When the communication control apparatus 10 processes a packet transmitted from a cellular phone terminal, for example, the connection management server 120 authenticates the user as a user entitled to enjoy the service of the communication control system 100, based on information included in the packet, which uniquely identifies the cellular phone terminal. Once the user is authenticated, packets transmitted from the IP address, which is temporarily provided for the cellular phone terminal, will be transmitted to the communication control apparatus 10 and processed therein, without being authenticated by the connection management server 120 during a certain period. The message output server 130 outputs a message to the destination or the source of packet transmission, according to whether the communication control apparatus 10 has permitted the packet communication. The log management server 140 manages the operating history of the communication control apparatus 10. The database server 150 acquires the latest database from an external source and provides the database to the communication control apparatus 10. To update the database without halting the operation of the communication control apparatus 10, the apparatus may possess a backup database. The operation monitoring server 110 monitors the operating state of the communication control apparatus 10 and its peripheral apparatuses including the connection management server 120, message output server 130, log management server 140 and database server 150. The operation monitoring server 110 has the highest priority in the communication control system 100 and performs supervisory control of the communication control apparatus 10 and all the peripheral apparatuses. Although the communication control apparatus 10 is configured with a dedicated hardware circuit, as will be described later, the operation monitoring server 110 can monitor the operating state even while the communication control apparatus 10 is in operation, by inputting to or outputting from the communication control apparatus 10 the data for monitoring by means of a boundary-scan circuit based on the technique described in Japanese Patent No. 3041340 filed by the present applicant or other techniques.

In the communication control system 100 of the base technology, as will be described below, the communication control apparatus 10, configured with a dedicated hardware circuit for faster operation, is controlled by using a group of peripheral servers connected thereto and having various functions. Accordingly, by suitably replacing the software of the group of servers, a wide variety of functions can be achieved with a similar configuration. Thus, the base technology provides such communication control system having high flexibility.

Figure 2:
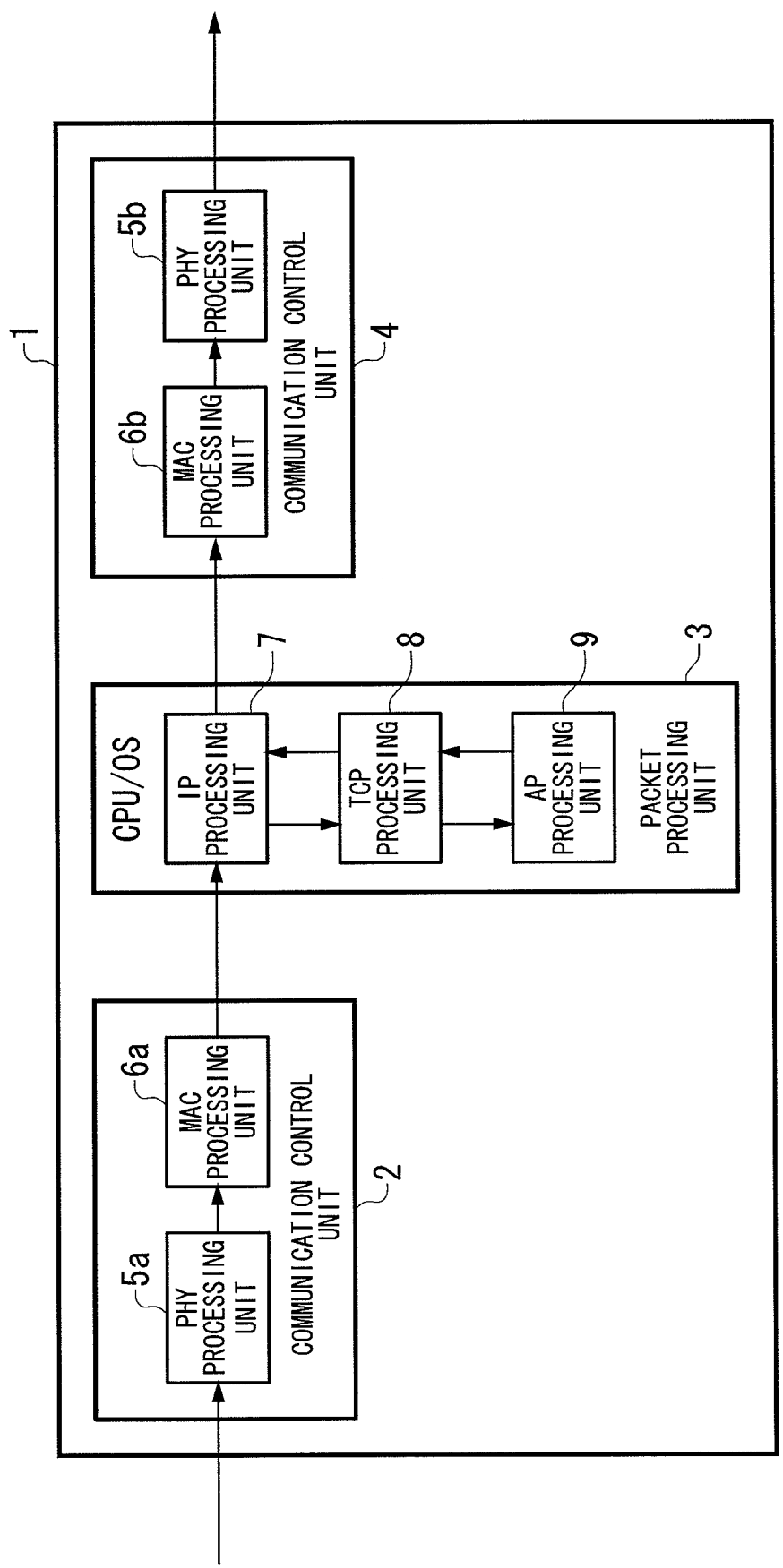
FIG. 2 is a diagram that shows a configuration of a conventional communication control apparatus.

FIG. 2 shows a configuration of a conventional communication control apparatus 1. The conventional communication control apparatus 1 comprises a communication control unit 2 on the receiving side, a packet processing unit 3, and a communication control unit 4 on the sending side. The communication control units 2 and 4 include PHY processing units 5a and 5b for performing physical layer processing of packets, and MAC processing units 6a and 6b for performing MAC layer processing of packets, respectively. The packet processing unit 3 includes protocol processing units for performing protocol-specific processing, such as an IP processing unit 7 for performing IP (Internet Protocol) processing and a TCP processing unit 8 for performing TCP (Transport Control Protocol) processing. The packet processing unit 3 also includes an AP processing unit 9 for performing application layer processing. The AP processing unit 9 performs filtering or other processing according to data included in a packet.

The packet processing unit 3 of the conventional communication control apparatus 1 is implemented by software, using a general-purpose processor, or CPU, and an OS running on the CPU. With such configuration, however, the performance of the communication control apparatus 1 depends on the performance of the CPU, hampering the creation of a communication control apparatus capable of high-speed processing of a large volume of packets. For example, a 64-bit CPU can process only up to 64 bits at a time, and hence, there has existed no communication control apparatus having a higher performance than this. In addition, since the conventional communication control apparatus is predicated on the presence of an OS with versatile functionality, the possibility of security holes cannot be eliminated completely, requiring maintenance work including OS upgrades.

Figure 3:
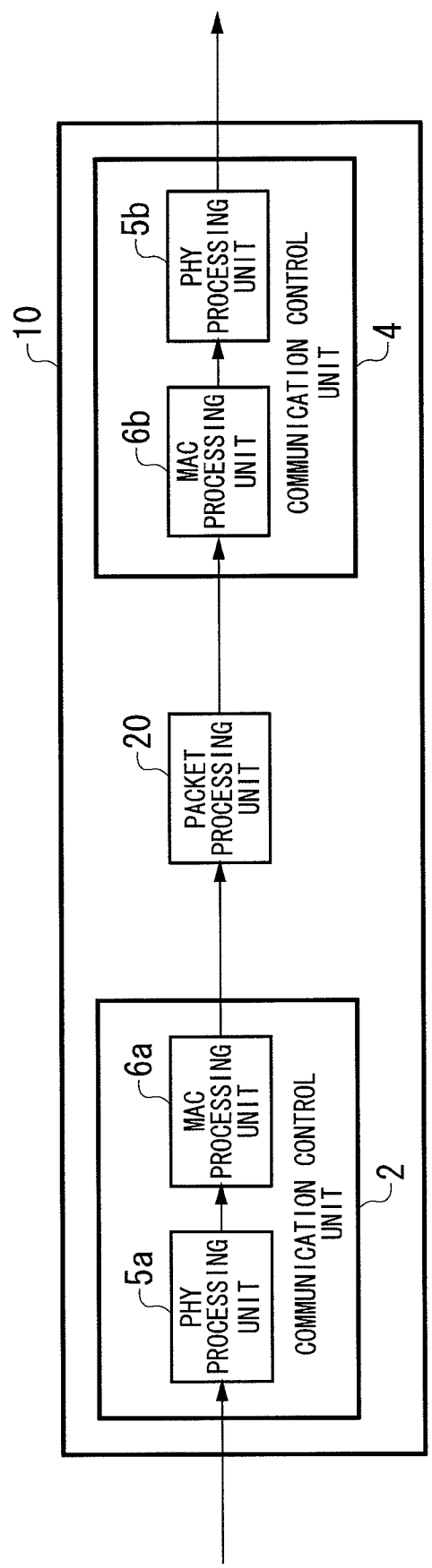
FIG. 3 is a diagram that shows a configuration of a communication control apparatus according to the base technology.

FIG. 3 shows a configuration of a communication control apparatus according to the base technology. A communication control apparatus 10 of the base technology comprises a packet processing circuit 20 configured with dedicated hardware employing a wired logic circuit, instead of a packet processing unit that is implemented by software including a CPU and an OS in a conventional communication control apparatus. By providing a dedicated hardware circuit to process communication data, rather than processing it with an OS and software running on a general-purpose processing circuit such as CPU, the performance limitations posed by the CPU or OS can be overcome, enabling a communication control apparatus having high throughput.

For example, a case will be considered here in which search is conducted in packet filtering or the like to check if the data in a packet includes reference data, which serves as criteria for filtering. When a CPU is used to compare the communication data with the reference data, there occurs a problem in that, since only 64-bit data can be compared at a time, the processing speed cannot be improved beyond such CPU performance. Since the CPU needs to repeat the process of loading 64 bits of communication data into a memory and comparing it with the reference data, the memory load time becomes a bottleneck that limits the processing speed.

In the base technology, by contrast, a dedicated hardware circuit configured with a wired logic circuit is provided to compare communication data with reference data. This circuit includes multiple comparators arranged in parallel, so as to enable the comparison of data having a length greater than 64 bits, such as 1024 bits. By providing dedicated hardware in such manner, bit matching can be simultaneously performed on a large number of bits in parallel. Since 1024-bit data can be processed at a time, while the conventional communication control apparatus 1 using a CPU processes only 64 bits, the processing speed can be improved remarkably. Increasing the number of comparators will improve the throughput, but also increase the cost and size of the apparatus. Accordingly, an optimal hardware circuit may be designed in accordance with the desired performance, cost or size.

Since the communication control apparatus 10 of the base technology is configured with dedicated hardware employing a wired logic circuit, it does not require any OS (Operating System). This can eliminate the need for the installation, bug fixes, or version upgrades of an OS, thereby reducing the cost and man-hours required for administration and maintenance. Also, unlike CPUs requiring versatile functionality, the communication control apparatus 10 does not include any unnecessary functions or use needless resources, and hence, reduced cost, a smaller circuit area or improved processing speed can be expected. Furthermore, again unlike conventional OS-based communication control apparatuses, the absence of unnecessary functions decreases the possibility of security holes and thus enhances the tolerance against attacks from malicious third parties over a network.

The conventional communication control apparatus 1 processes packets using software predicated on a CPU and an OS. Therefore, all packet data needs to be received before protocol processing is performed, and then the data is passed to an application. In contrast, since packet processing is performed by a dedicated hardware circuit in the communication control apparatus 10 of the base technology, all packet data need not be received before starting the processing; upon reception of necessary data, the processing can be started at any given point in time without waiting for the reception of subsequent data. For example, position detection processing in a position detection circuit, which will be described later, may be started at the time when position identification data for identifying the position of comparison target data is received. Thus, various types of processing can be performed in parallel without waiting for the reception of all data, reducing the time required to process packet data.

Figure 4:
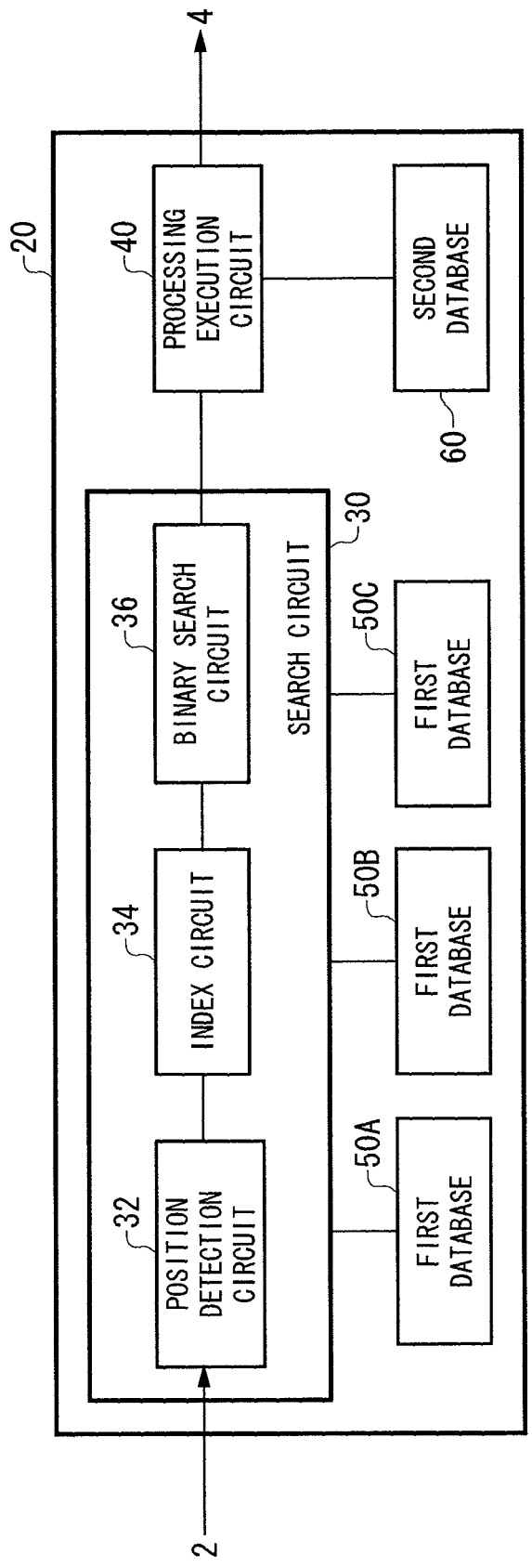
FIG. 4 is a diagram that shows a configuration of a packet processing circuit.

FIG. 4 shows an internal configuration of the packet processing circuit. The packet processing circuit 20 comprises: first databases 50A, 50B and 50C (hereinafter, they may be collectively referred to as "first databases 50") for storing reference data, which is referred to when processing to be performed on communication data is determined; a search circuit 30 for searching received communication data for the reference data by comparing the two; a second database 60 for storing a search result of the search circuit 30 and a content of processing to be performed on the communication data, which are related to each other; and a process execution circuit 40 for processing the communication data based on the search result of the search circuit 30 and the conditions stored in the second database 60.

The search circuit 30 includes: a position detection circuit 32 for detecting the position of comparison target data, which is to be compared with reference data, in communication data; an index circuit 34 which serves as an example of a determination circuit that determines which range the comparison target data belongs to among three or more ranges, into which the reference data stored in the first database 50 is divided; and a binary search circuit 36 for searching the determined range for the reference data that matches the comparison target data. The reference data may be searched for the comparison target data using any search technique, and a binary search method is used in the base technology. Since an improved binary search method is employed, as will be discussed later, three first databases 50 are provided in the base technology. The first databases 50A, 50B and 50C store the same reference data.

Figure 5:
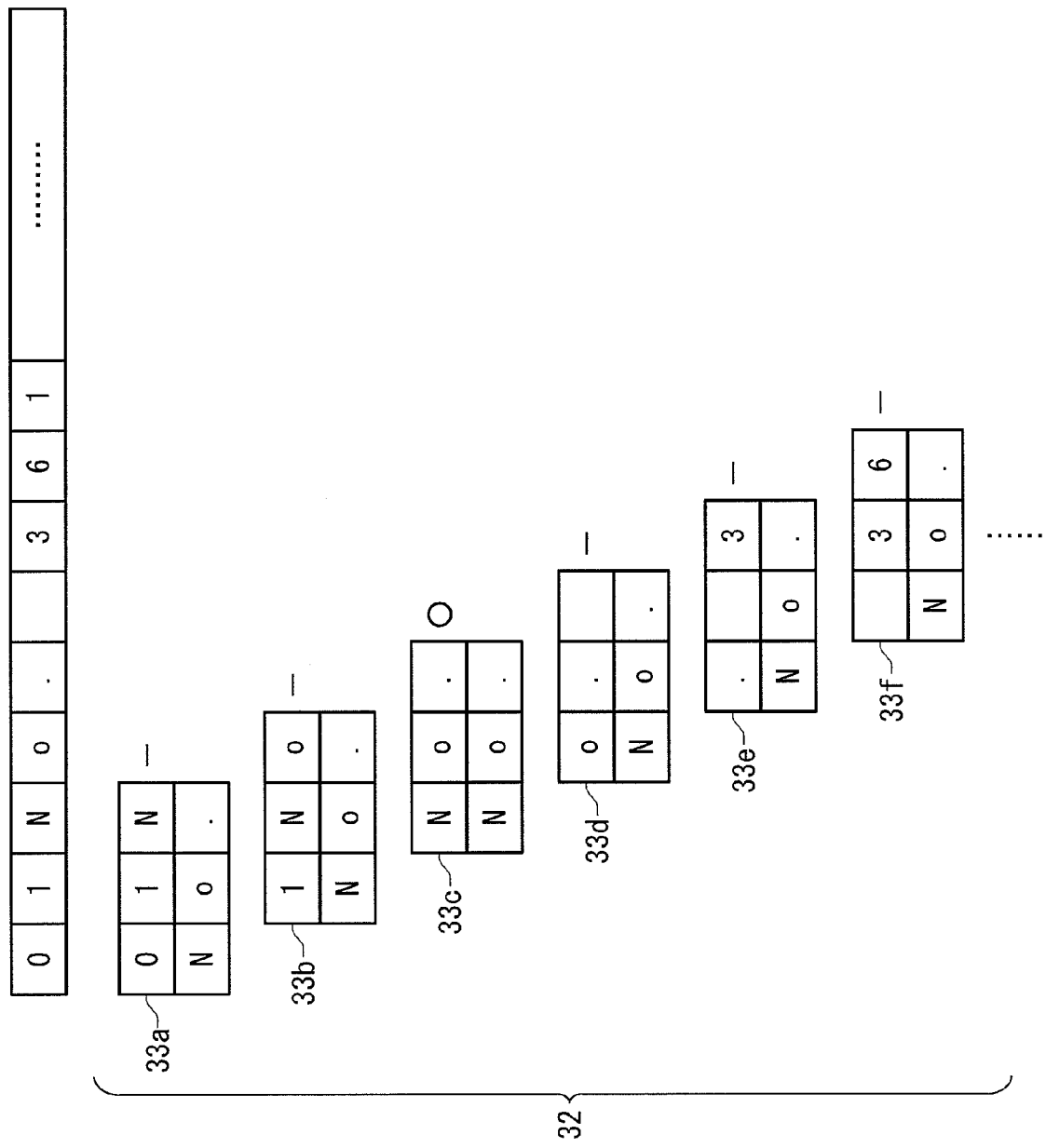
FIG. 5 is a diagram that shows a configuration of a position detection circuit.

FIG. 5 shows an internal configuration of the position detection circuit. The position detection circuit 32 includes multiple comparison circuits 33a-33f that compare communication data with position identification data for identifying the position of comparison target data. While six comparison circuits 33a-33f are provided here, the number of comparison circuits may be arbitrary, as will be described later. To the comparison circuits 33a-33f are input pieces of communication data, with each piece shifted from the preceding one by a predetermined data length, such as 1 byte. These multiple comparison circuits 33a-33f then simultaneously compare the respective communication data with the position identification data to be detected in parallel.

The base technology will be described by way of example for explaining the operation of the communication control apparatus 10, in which a character string "No. ###" in communication data is detected, the number "###" included in the character string is then compared with reference data, and if the number matches the reference data, the packet will be allowed to pass, while, if they do not match, the packet will be discarded.

In the example of FIG. 5, communication data "01No. 361 . . . " is input to the comparison circuits 33a-33f with a shift of one character each, and position identification data "No." for identifying the position of the number "###" is sought to be detected in the communication data. More specifically, "01N" is input to the comparison circuit 33a, "1No" to the comparison circuit 33b, "No." to the comparison circuit 33c, "o. " to the comparison circuit 33d, ". 3" to the comparison circuit 33e, and "36" to the comparison circuit 33f. Then, the comparison circuits 33a-33f simultaneously perform comparisons with the position identification data "No.". Consequently, there is found a match with the comparison circuit 33c, indicating that the character string "No." exists at the third character from the top of the communication data. Thus, it is found that the numeral data as comparison target data exists subsequent to the position identification data "No." detected by the position detection circuit 32.

When the same processing is performed by a CPU, since the comparison process needs to be serially performed one by one from the top, such as comparing character strings "01N" and "No." before comparing "1No" and "No.", no improvement of detection speed can be expected. In the communication control apparatus 10 of the base technology, in contrast, providing the multiple comparison circuits 33a-33f in parallel enables simultaneous parallel comparison processing, which could not have been performed with a CPU, improving the processing speed significantly. Providing more comparison circuits will improve the detection speed, as more characters can be compared simultaneously. In consideration of cost or size, a sufficient number of comparison circuits may be provided to achieve a desired detection speed.

Aside from detecting position identification data, the position detection circuit 32 may also be used as a circuit for detecting character strings for various purposes. Moreover, the position detection circuit 32 may be configured to detect position identification data in units of bits, not just as a character string.

Figure 6:
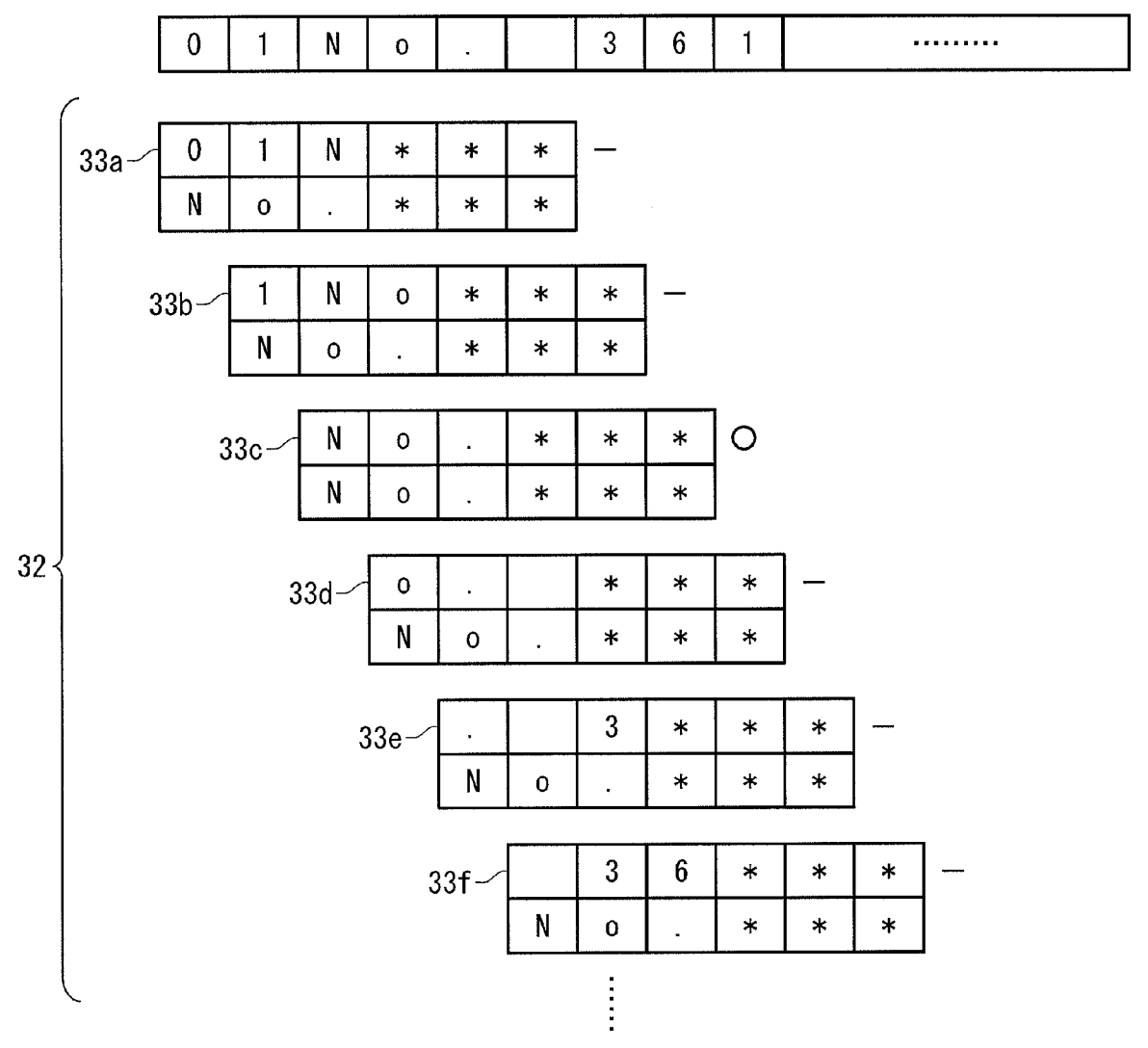

FIG. 6 shows another example of the position detection circuit. In the example shown in FIG. 6, when the data length of position identification data is shorter than that prepared in each of the comparison circuits 33a-33f in the position detection circuit 32, predetermined data, such as "00H" or "01H", is padded posterior to the position identification data. Similarly, with regard to communication data to be compared with position identification data, a data length identical with that of the position identification data is extracted from the communication data and input to a comparison circuit, and the same data as padded after the position identification data is also padded posterior thereto. In such case, the communication data may be copied as work, and the copied data may be processed to be input to the comparison circuits 33a-33f, so as not to change the original communication data. Thus, the position detection circuit 32 can be generally used regardless of the length of position identification data.

Figure 7:
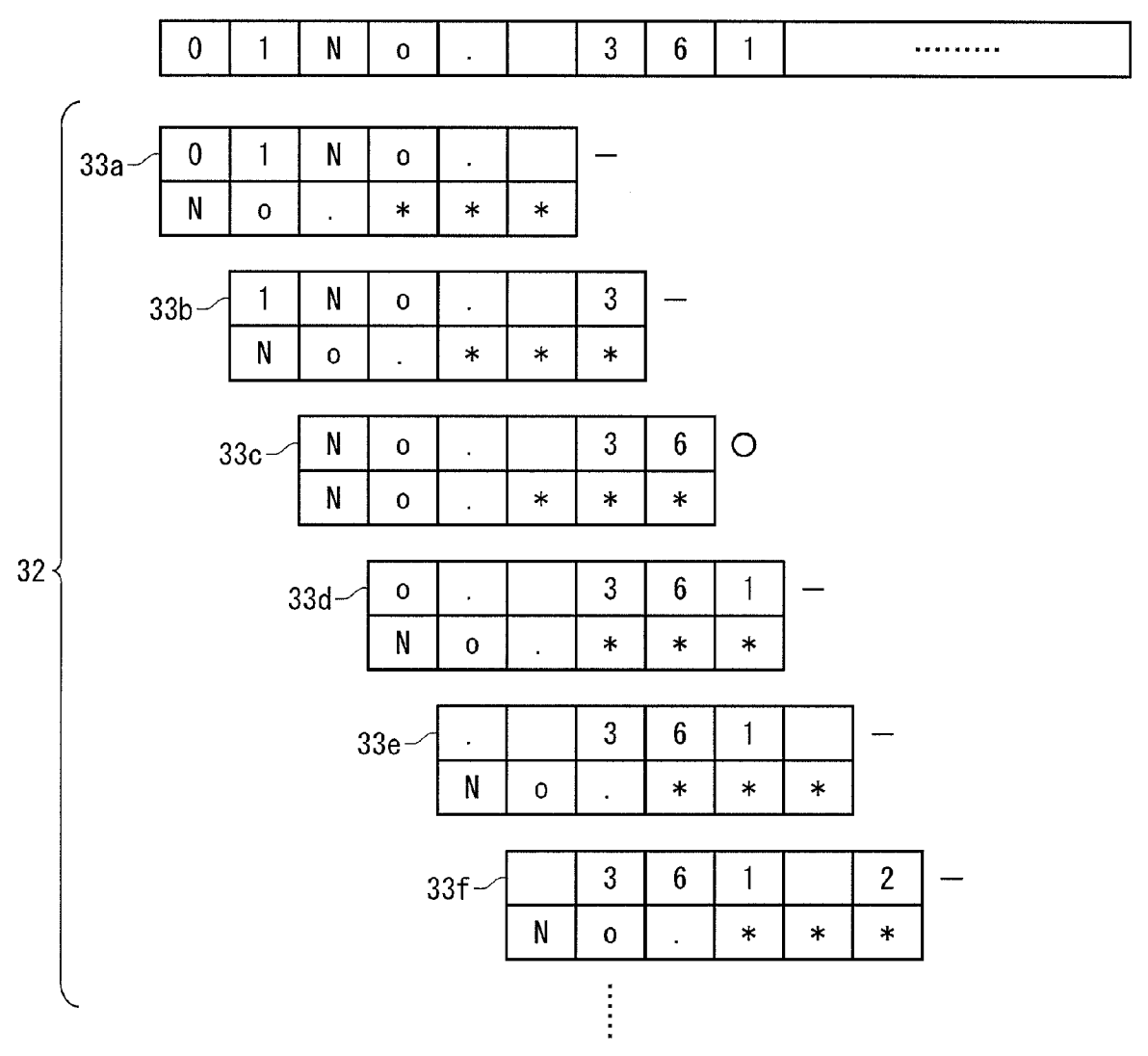

FIG. 7 shows yet another example of the position detection circuit. In the example shown in FIG. 7, predetermined data is padded posterior to position identification data in the same way as shown in the example of FIG. 6, and, in addition, such data is regarded as a wild card. That is, when data is input as a wild card into the comparison circuits 33a-33f, it is determined that the corresponding part of target data to be compared matches the wild-card data whatever the target data is. Thus, the position detection circuit 32 can be generally used regardless of the length of position identification data.

Figure 8:
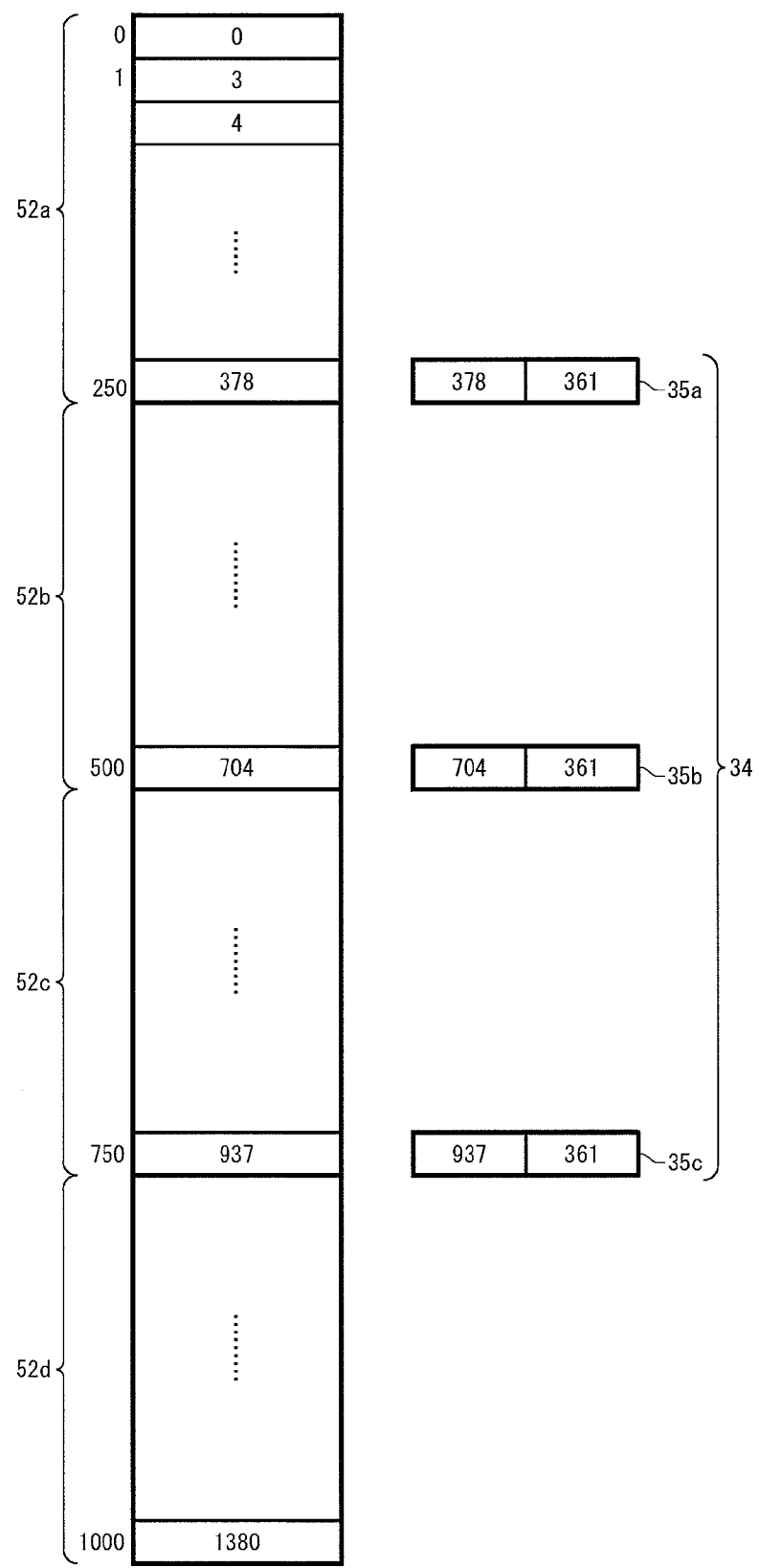
FIG. 8 is a diagram that shows an example of internal data of a first database.

FIG. 8 shows an example of internal data of the first database. The first database 50 stores reference data, which is referred to when processing on packets, such as filtering, routing, switching, or replacement, is determined. The pieces of reference data are sorted according to some sort conditions and stored in ascending or descending order. In the example of FIG. 8, 1000 pieces of reference data are stored.

The index circuit 34 determines which range comparison target data belongs to among three or more ranges, such as 52a-52d, into which reference data stored in the first database 50 is divided. In the example of FIG. 8, the 1000 pieces of reference data are divided into four ranges 52a-52d, i.e., 250 pieces each in a range. The index circuit 34 includes multiple comparison circuits 35a-35c, each of which compares a piece of reference data at the border of the range with the comparison target data. Since the comparison circuits 35a-35c simultaneously compare the pieces of reference data at the borders with the comparison target data in parallel, which range the comparison target data belongs to can be determined by a single operation of comparison processing.

The pieces of reference data at the borders to be input to the comparison circuits 35a-35c of the index circuit 34 may be set by an apparatus provided outside the communication control apparatus 10. Alternatively, reference data at predetermined positions in the first database 50 may be set in advance to be automatically input as such. In the latter case, even when the first database 50 is updated, the reference data at the predetermined positions in the first database 50 are automatically input to the comparison circuits 35a-35c. Therefore, the communication control processing can be performed immediately without initialization or the like.

As mentioned previously, CPU-based binary search cannot make multiple comparisons at the same time. In the communication control apparatus 10 of the base technology, in contrast, providing the multiple comparison circuits 35a-35c in parallel enables simultaneous parallel comparison processing, with a significant improvement in the search speed.

After the index circuit 34 determines the relevant range, the binary search circuit 36 performs search using a binary search method. The binary search circuit 36 divides the range determined by the index circuit 34 further into $2^n$ and subsequently compares the pieces of reference data lying at the borders with the comparison target data, thereby determining which range the comparison target data belongs to. The binary search circuit 36 includes multiple comparators for comparing, bit by bit, reference data with comparison target data. For example, in the base technology are provided 1024 comparators to perform bit matching on 1024 bits simultaneously. When the range to which the comparison target data belongs is determined among the $2^n$ split ranges, the determined range is further divided into $2^n$. Then, the pieces of reference data lying at the borders are read out to be compared with the comparison target data. Thereafter, this processing is repeated to narrow the range further until reference data that matches the comparison target data is eventually found.

The operation will now be described in more detail in conjunction with the foregoing example. Each of the comparison circuits 35a-35c of the index circuit 34 receives "361" as comparison target data. As for reference data, the comparison circuit 35a receives "378", which lies at the border of the ranges 52a and 52b. Similarly, the comparison circuit 35b receives reference data "704" lying at the border of the ranges 52b and 52c, and the comparison circuit 35c receives reference data "937" lying at the border of the ranges 52c and 52d. The comparison circuits 35a-35c then perform comparisons simultaneously, determining that the comparison target data "361" belongs to the range 52a. Subsequently, the binary search circuit 36 searches the reference data for the comparison target data "361".

Figure 9:
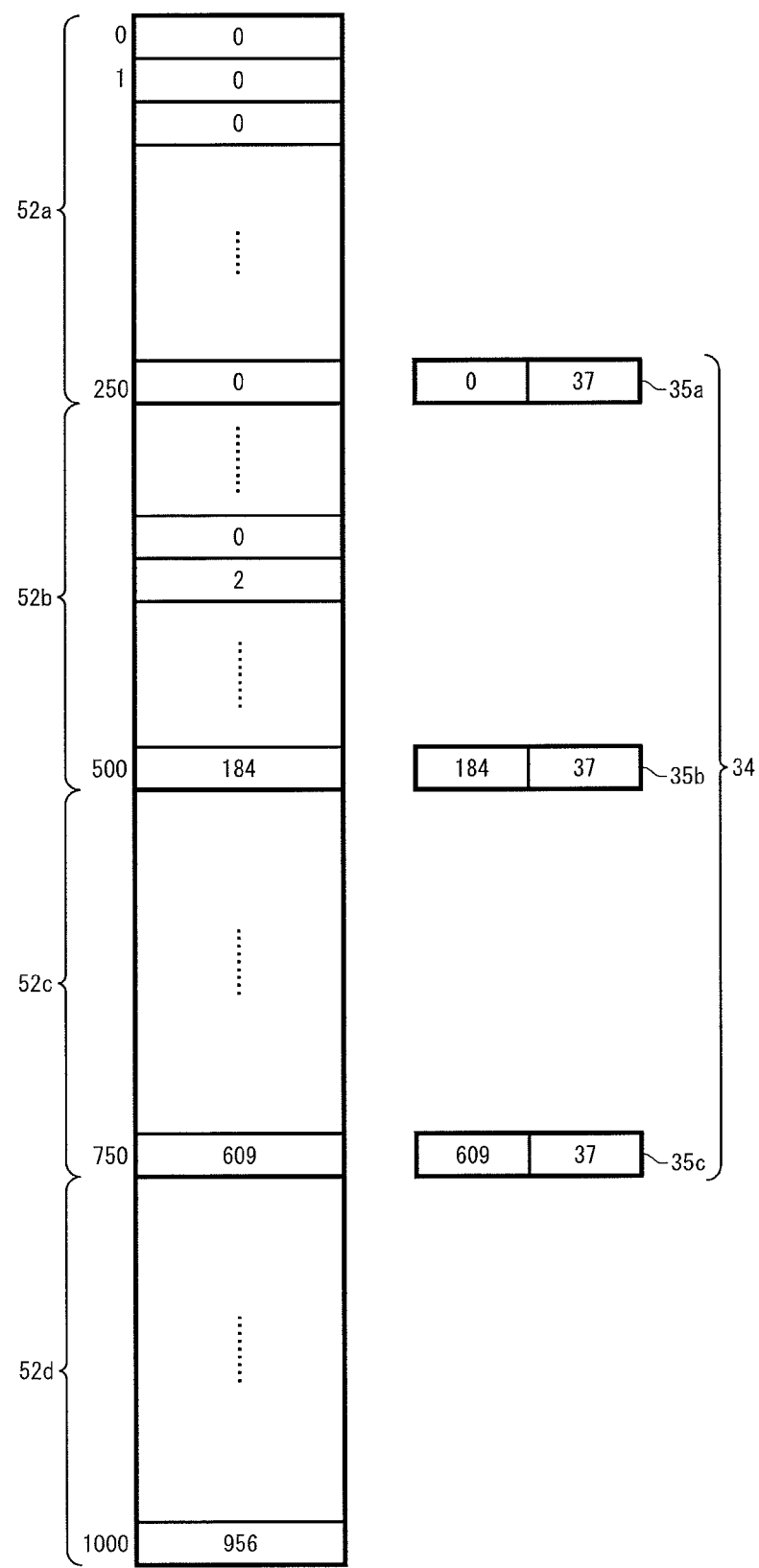
FIG. 9 is a diagram that shows another example of internal data of the first database.

FIG. 9 shows another example of internal data of the first database. In the example shown in FIG. 9, the number of pieces of reference data is smaller than the number of pieces of data storable in the first database 50, i.e., 1000 in this case. In such instance, the first database 50 stores the pieces of reference data in descending order, starting with the last data position therein. Then, 0 is stored in the rest of the data positions. The database is loaded with data not from the top but from the bottom of the loading area, and all the vacancies occurring in the front of the loading area, if any, are replaced with zero. Consequently, the database is fully loaded at any time, so that the search time necessary for binary search will be constant. Moreover, if the binary search circuit 36 reads reference data "0" during a search, the circuit can identify the range without making a comparison, as the comparison result is obvious, and can proceed to the next comparison. Consequently, the search speed can be improved.

In CPU-based software processing, the first database 50 stores pieces of reference data in ascending order, from the first data position therein. In the rest of data positions will be stored a maximum value or the like, and in such case, the skip of comparison processing as described above cannot be made during binary search. The comparison technique described above can be implemented by configuring the search circuit 30 with a dedicated hardware circuit.

Figure 10:
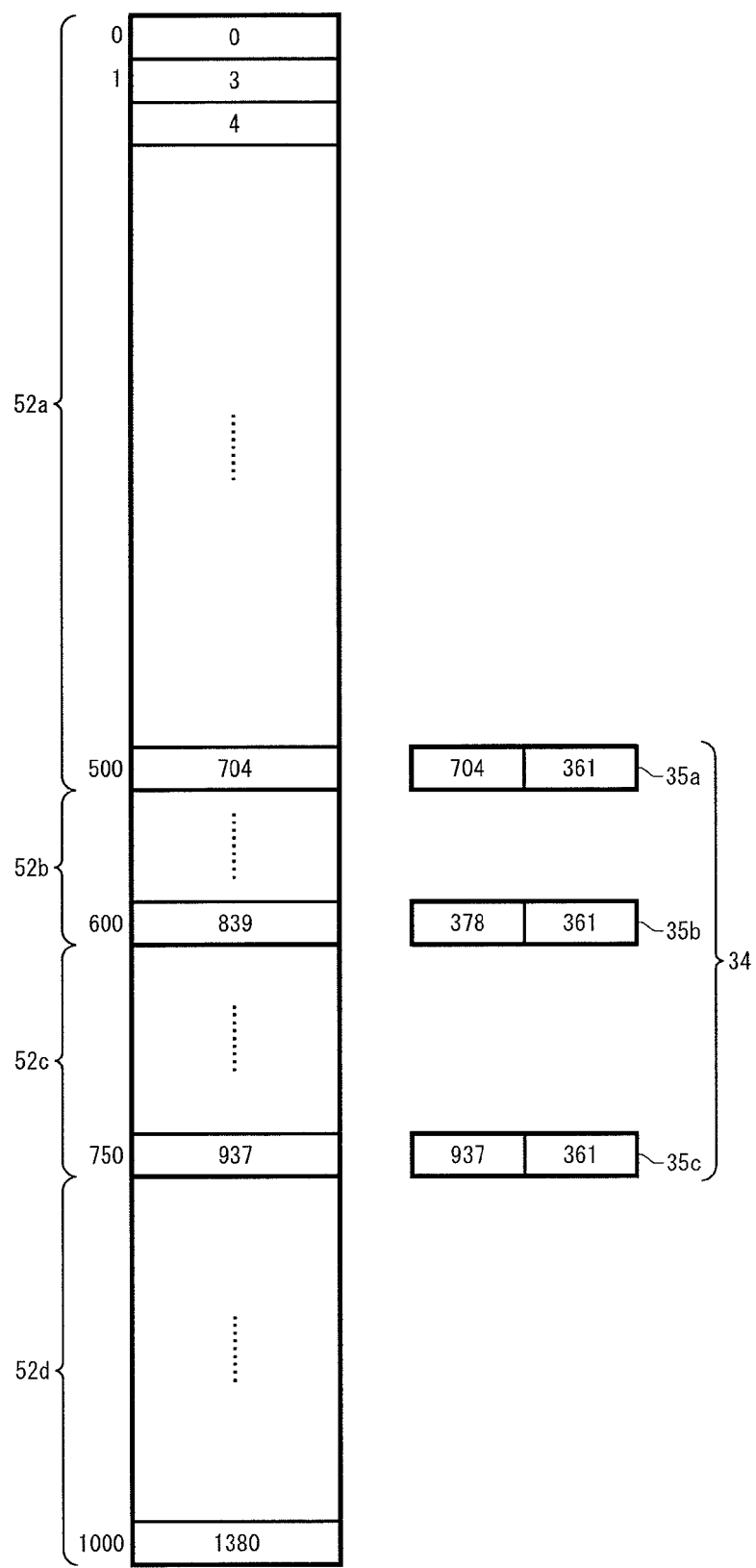
FIG. 10 is a diagram that shows yet another example of internal data of the first database.

FIG. 10 shows yet another example of internal data of the first database. In the example shown in FIG. 10, the reference data is not evenly divided into three or more ranges, but unevenly divided into ranges that accommodate different numbers of pieces of data, such as 500 pieces in the range 52a and 100 pieces in the range 52b. These ranges may be determined depending on the distribution of frequencies with which reference data occurs in communication data. Specifically, the ranges may be determined so that the sums of the frequencies of occurrence of reference data belonging to the respective ranges are almost the same. Accordingly, the search efficiency can be improved. The reference data to be input to the comparison circuits 35a-35c of the index circuit 34 may be modifiable from the outside. In such case, the ranges can be dynamically set, so that the search efficiency will be optimized.

Figure 11:
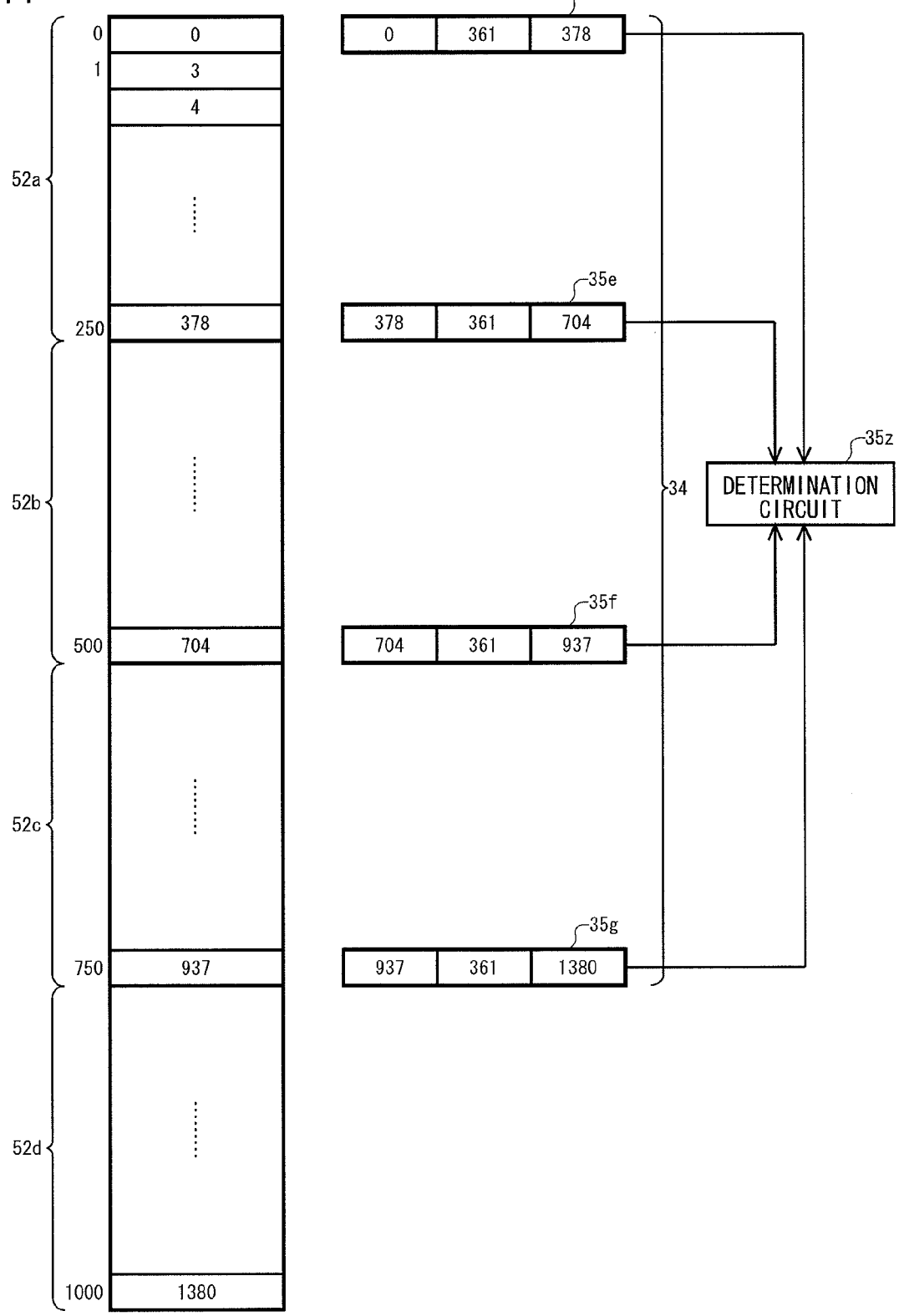
FIG. 11 is a diagram that shows another example of the index circuit.

FIG. 11 shows another example of the index circuit. In the examples of FIGS. 8-10, the index circuit 34 uses the three comparison circuits 35a-35c to determine which range comparison target data belongs to among the four ranges of 52a-52d in the first database 50. In the example shown in FIG. 11, on the other hand, the index circuit 34 is provided with four comparison circuits 35d-35g for determining whether or not comparison target data is included in each of the four ranges 52a-52d. For example, into the comparison circuit 35d are input the 0th and 250th pieces of reference data in the first database 50 and comparison target data. Then, each piece of the reference data is compared to the comparison target data, so as to determine whether or not the reference data is included in the range 52a. The comparison results provided by the comparison circuits 35d-35g are input into a determination circuit 35z, which outputs information providing which range the reference data is included in. Each of the comparison circuits 35d-35g may output a result indicating whether the reference data is included between the two input pieces of reference data, or may output a result indicating that the reference data is greater than the range, the reference data is included in the range, or the reference data is smaller than the range. When it is determined that the comparison target data is not included in any of the ranges 52a-52d, it can be found that the comparison target data does not exist within the first database 50. Accordingly, the search can be terminated without performing any further binary search.

Figure 12:
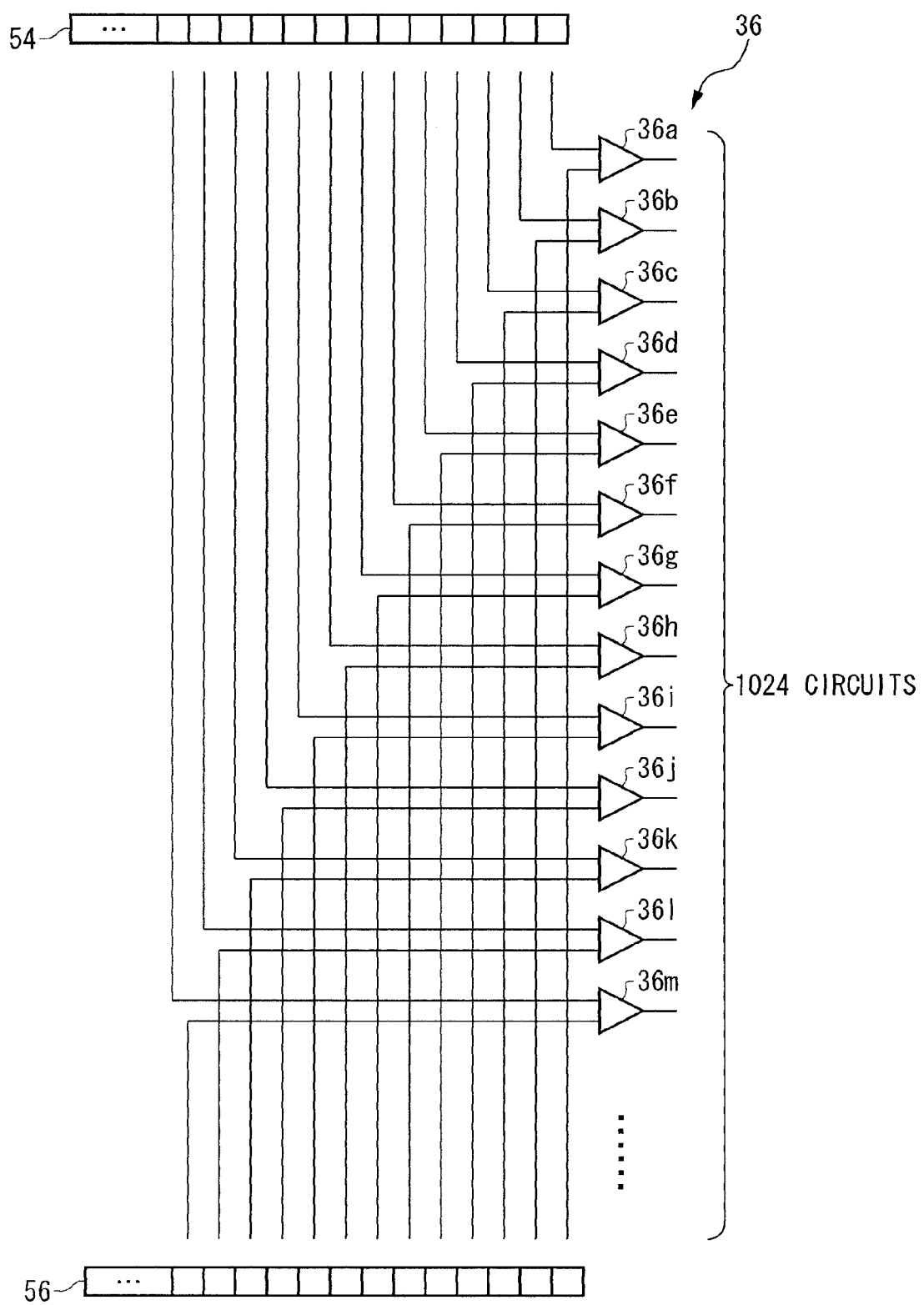
FIG. 12 is a diagram that shows a configuration of a comparison circuit included in a binary search circuit.

FIG. 12 shows a configuration of comparison circuits included in the binary search circuit. As mentioned previously, the comparison circuit in the binary search circuit 36 includes 1024 comparators, such as 36a, 36b, . . . . Each of the comparators 36a, 36b, etc. receives 1 bit of reference data 54 and 1 bit of comparison target data 56 to compare the bits in value. The comparison circuits 35a-35c of the index circuit 34 have similar internal configurations. Since the comparison processing is thus performed by a dedicated hardware circuit, a large number of comparison circuits can be operated in parallel to compare a large number of bits at a time, thereby speeding up the comparison processing.

Figure 13:
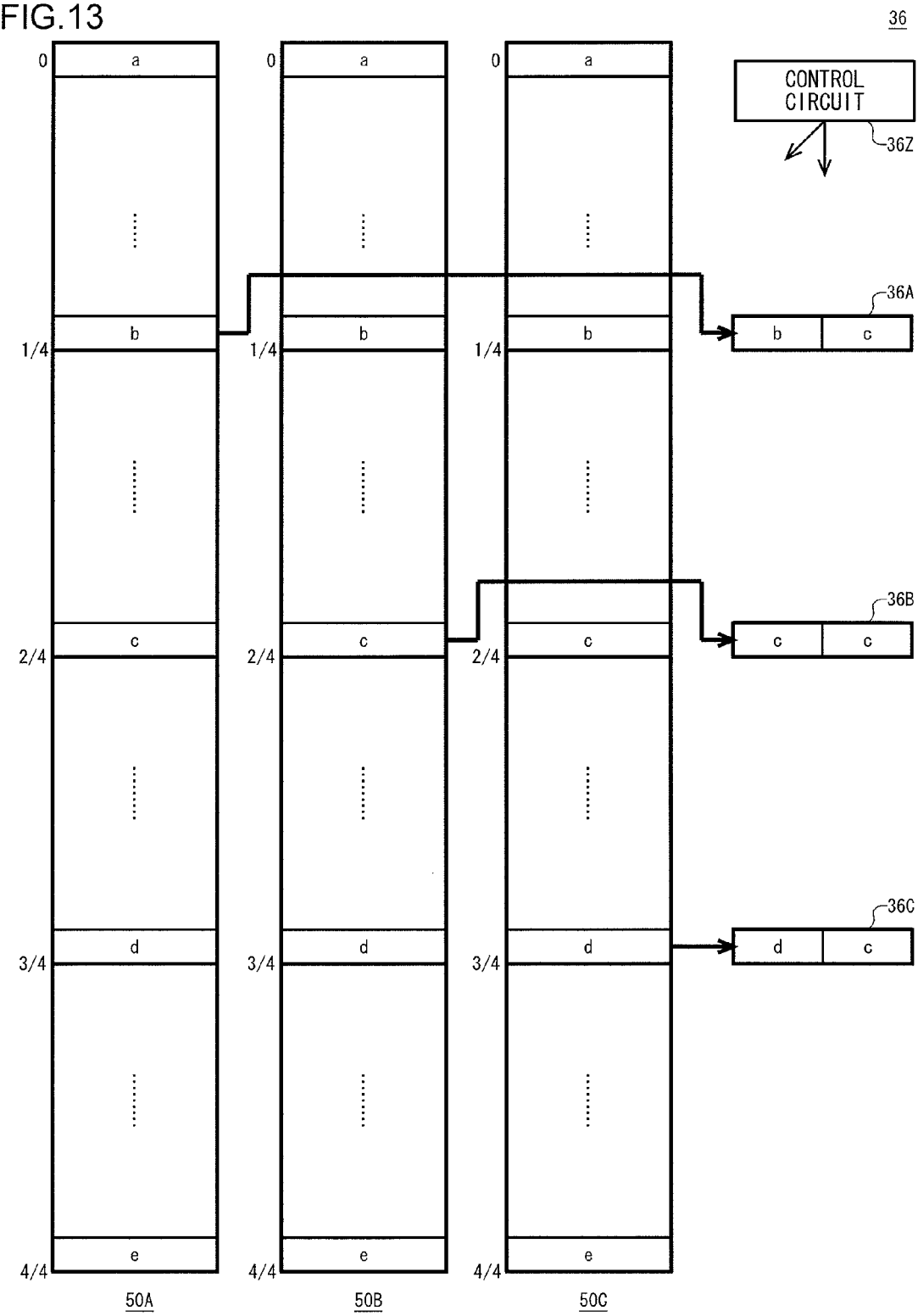
FIG. 13 is a diagram that shows a configuration of the binary search circuit.

FIG. 13 shows a configuration of the binary search circuit. The binary search circuit 36 includes comparison circuits 36A, 36B and 36C, each of which includes the 1024 comparators 36a, 36b, etc. as shown in FIG. 12, and a control circuit 36Z for controlling the comparison circuits.

In a conventional binary search method, a piece of data lying at the one-half position in the search range of a database, in which pieces of data are aligned in ascending or descending order, is read out to be compared with comparison target data in the first search. When the pieces of data are aligned in ascending order and if the comparison target data is smaller than the read out data, it means that the comparison target data might exist within the first half of the search range. Accordingly, in the second search, the search range is newly set to the first half and a piece of data lying at the one-half position in the range, i.e. at the one-quarter position in the original search range, is read out to be compared with the comparison target data. Conversely, if the comparison target data is greater than the read out data, it means that the comparison target data might exist within the second half of the search range. Accordingly, the new search range is set to the second half and a piece of data lying at the one-half position in the range, i.e. at the three-quarter position in the original search range, is read out to be compared with the comparison target data in the second search. In this way, the search range is narrowed by half repeatedly until the target data is reached.

In the base technology, in contrast, three comparison circuits are provided for binary search, so that when the data at the one-half position in the search range is compared with comparison target data for the first search, the comparison for the second search between the comparison target data and each of the pieces of data at the one-quarter and three-quarter positions in the search range can be simultaneously performed in parallel. Thus, the first and second searches can be performed at the same time, thereby reducing the time required to load the data from the database. Also, by operating three comparison circuits in parallel, the number of comparisons can be reduced by half, thereby reducing the search time.

In the example of FIG. 13, three comparison circuits are provided to perform two searches simultaneously. When n searches are to be performed simultaneously, $2^n-1$ comparison circuits may be generally provided. The control circuit 36Z inputs each piece of data at the $1/2^n$, $2/2^n$, . . . , and $(2^n-1)/2^n$ positions in the search range into the $2^n-1$ comparison circuits respectively, and operates the comparison circuits simultaneously in parallel to allow them to compare the respective pieces of data with comparison target data. The control circuit 36Z then acquires the comparison results from the comparison circuits and determines if the comparison target data is found. If any of the comparison circuits output a signal indicating that there has been a data match, the control circuit 36Z will determine that the comparison target data has been found and will terminate the binary search. If there is no such signal output, the process will be shifted to the next search. If the comparison target data exists within the database, the data must lie within a range between points where the comparison results of the $2^n-1$ comparison circuits change. In the case where 15 comparison circuits are provided, for example, if the piece of data at the 5/16 position is smaller than comparison target data and if the piece of data at the 6/16 position is greater than the comparison target data, the comparison target data should lie within the range between the 5/16 and 6/16 positions. Thus, the control circuit 36Z acquires comparison results from the comparison circuits and sets the next search range to a range between points where the comparison results change. The control circuit 36Z then inputs, into the respective comparison circuits, each piece of data at the $1/2^n$, $2/2^n$, . . . , and $(2^n-1)/2^n$ positions in the next search range thus set.

There are provided the three first databases 50 in the base technology: the first database 50A is connected to the comparison circuit 36A and supplies thereto a piece of data at the one-quarter position in the search range; the first database 50B is connected to the comparison circuit 36B and supplies thereto a piece of data at the two-quarter position in the search range; and the first database 50C is connected to the comparison circuit 36C and supplies thereto a piece of data at the three-quarter position in the search range. Therefore, pieces of data can be loaded simultaneously into the comparison circuits in parallel, thereby further reducing the time for data loading and enabling high-speed binary search.

Providing more comparison circuits will improve the search speed. In consideration of cost or size of the system, a sufficient number of comparison circuits may be provided to achieve a desired search speed. Also, although it is desirable that first databases as many as comparison circuits are provided, some comparison circuits may share a database in consideration of cost or size of the system.

FIG. 14 shows still yet another example of internal data of the first database. The first database 50 shown in FIG. 14 stores URLs of contents to which filtering is applied. The data stored in the first database 50 may include predetermined data recognized as a wild card, such as "00H" or "01H". In the example shown in FIG. 14, "*******" is recognized as a wild card in "http://www.xx.xx/*****", and, whatever the comparison target data corresponding thereto is, it is determined in the comparators 36a, 36b, etc. that such data matches the wild card. Accordingly, every character string starting with "http://www.xx.xx/" is detected by the binary search circuit 36**. Consequently, processing such as applying filtering to all contents within the domain "http://www.xx.xx/" can be easily performed.

FIG. 15 shows an example of internal data of the second database. The second database 60 includes a search result field 62, which contains a search result of the search circuit 30, and a processing content field 64, which contains a processing content to be performed on communication data. The database stores the search results and the processing contents related to each other. In the example of FIG. 15, conditions are established such that a packet will be allowed to pass if its communication data contains reference data; if not, the packet will be discarded. The process execution circuit 40 searches the second database 60 for a processing content based on the search result and performs the processing on the communication data. The process execution circuit 40 may also be configured with a wired logic circuit.

FIG. 16 shows another example of internal data of the second database. In the example of FIG. 16, the processing content is set for each piece of reference data. With regard to packet replacement, replacement data may be stored in the second database 60. As for packet routing or switching, information on the route may be stored in the second database 60. The process execution circuit 40 performs processing, such as filtering, routing, switching, or replacement, which is specified in the second database 60, in accordance with the search result of the search circuit 30. When the processing content is set for each piece of reference data, as shown in FIG. 16, the first database 50 and the second database 60 may be merged with each other.

The first database and the second database are configured to be rewritable from the outside. By replacing these databases, various types of data processing and communication control can be achieved using the same communication control apparatus 10. Also, multistage search processing may be performed by providing two or more databases that store reference data to be searched. In such instance, more complicated conditional branching may be performed by providing two or more databases that store search results and processing contents related to each other. When multiple databases are thus provided to conduct multistage search, a plurality of the position detection circuits 32, the index circuits 34, the binary search circuits 36, etc. may also be provided.

The data intended for the foregoing comparison may be compressed by the same compression logic. If both the source data and the target data to be compared are compressed by the same method, the comparison can be performed in the same manner as usual, thus reducing the amount of data to be loaded for comparison. The smaller amount of data to be loaded can reduce the time required to read out the data from the memory, thereby reducing the overall processing time. Moreover, the number of comparators can be also reduced, which contributes to the miniaturization, weight saving, and cost reduction of the apparatus. The data intended for comparison may be stored in a compressed form, or may be read out from the memory and compressed before comparison.

Figure 17:
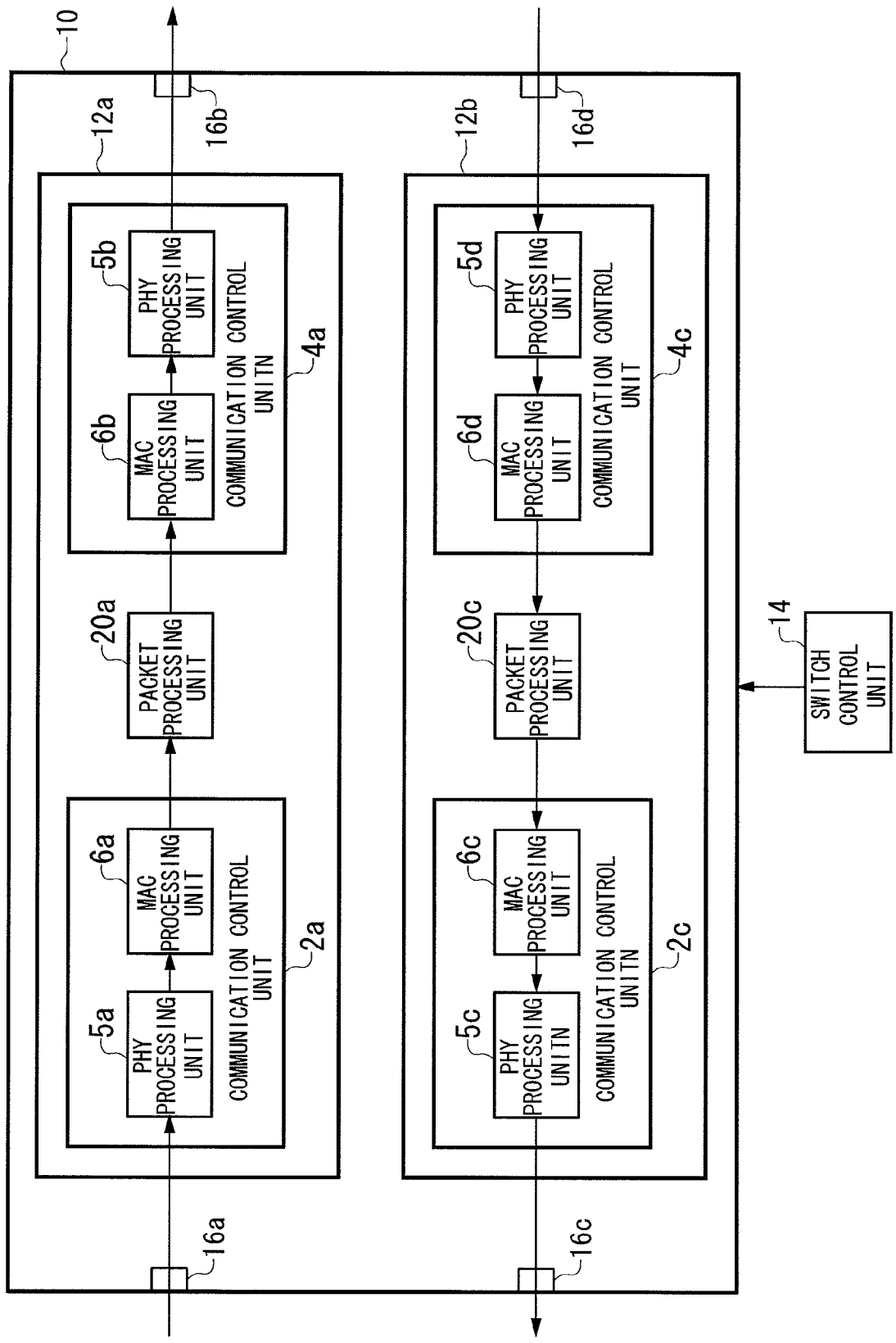
FIG. 17 is a diagram that shows another illustrative configuration of the communication control apparatus according to the base technology.

FIG. 17 shows another illustrative configuration of the communication control apparatus in the base technology. The communication control apparatus 10 shown in this diagram has two communication control units 12, each of which has the same configuration as the communication control apparatus 10 shown in FIG. 4. There is also provided a switch control unit 14 for controlling the operation of the individual communication control units 12. Each of the communication control units 12 has two input/output interfaces 16 and is connected to two networks, upstream and downstream, via the respective input/output interfaces 16. The communication control units 12 receive communication data from either one of the networks and output processed data to the other. The switch control unit 14 switches the inputs and outputs of the input/output interfaces 16 provided for the individual communication control units 12, thereby switching the directions of the flow of communication data in the communication control units 12. This allows communication control not only in one direction but also in both directions.

The switch control unit 14 may provide control such that: either one of the communication control units 12 processes inbound packets and the other processes outbound packets; both the units process inbound packets; or both the units process outbound packets. Consequently, the directions of communications to control can be changed depending on, for example, the traffic status or intended purpose.

The switch control unit 14 may acquire the operating state of the respective communication control units 12 and may switch the direction of communication control according thereto. For example, when one of the communication control units 12 is in a standby state and the other communication control unit 12 is in operation, the unit on standby may be activated as a substitute upon detection of the unit in operation stopping due to a failure or other reasons. This can improve the fault tolerance of the communication control apparatus 10. Also when one of the communication control units 12 needs maintenance such as a database update, the other communication control unit 12 may be operated as a substitute. Thus, appropriate maintenance can be performed without halting the operation of the communication control apparatus 10.

The communication control apparatus 10 may be provided with three or more communication control units 12. The switch control unit 14 may, for example, acquire the traffic status to control the direction of communications in the respective communication control units 12 so that more communication control units 12 are allocated for communication control processing in a direction handling higher traffic. This minimizes a drop in the communication speed, even when the traffic increases in one direction.

Figure 18:
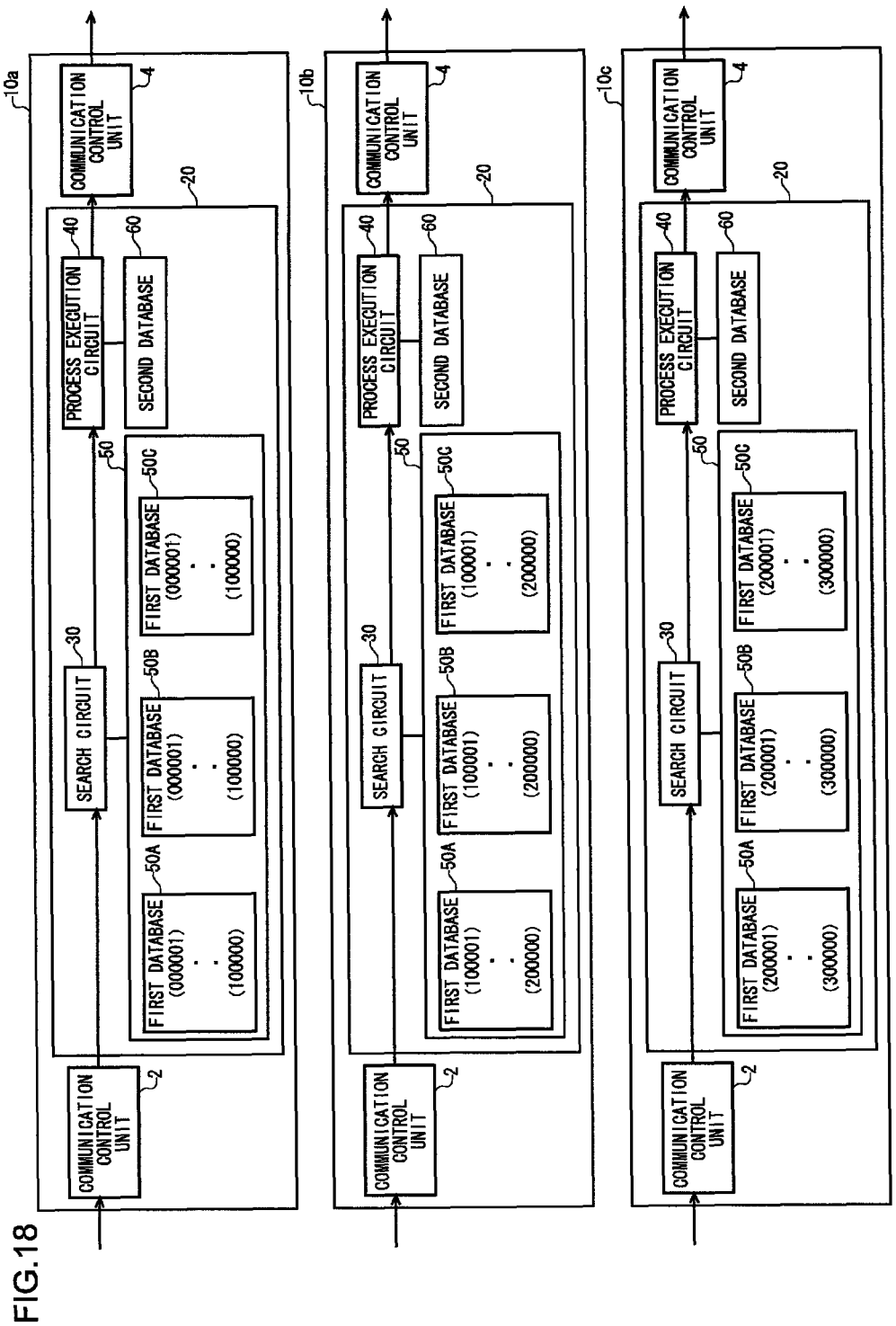
FIG. 18 is a diagram that shows a configuration of a communication control apparatus comprising multiple communication control apparatuses.

FIG. 18 shows a configuration of a communication control apparatus 10 comprising multiple communication control apparatuses 10a, 10b, 10c, etc. Since the first database 50 requires larger capacity in proportion to an increasing number of pieces of data, the database is divided into portions to be stored by the communication control apparatuses 10a, 10b, 10c, etc. As will be discussed later, in the communication control system 100 of the base technology, a communication packet to be processed is sent to all the communication control apparatuses 10a, 10b, 10c, etc. in operation, and each of the communication control apparatuses 10 then receives and processes the packet. For example, the communication control apparatus 10a stores data with data IDs "000001"-"100000", the communication control apparatus 10b stores data with data IDs "100001"-"200000", and the communication control apparatus 10c stores data with data IDs "200001"-"300000"; each of the communication control apparatuses refers to the respective data to process a packet.

FIG. 19 shows an example of internal data of a management table 111 provided in the operation monitoring server 110. The management table 111 includes apparatus ID fields 112, operating state fields 113 and data ID fields 114. The apparatus ID fields 112 contain the apparatus IDs of the communication control apparatuses 10a, 10b, etc. The operating state fields 113 contain the operating state of the communication control apparatuses, and the data ID fields 114 contain the ranges of data IDs handled by the communication control apparatuses. The operating state appears as "operating", "standby", "failure", "data updating", etc. The operating state fields 113 are updated by the operation monitoring server 110 each time the operating state of the communication control apparatuses 10a, 10b, etc. changes. In the example shown in FIG. 19, "465183" pieces of data are stored in the first database 50, so that the five communication control apparatuses 10 having the apparatus IDs "1"-"5" are in operation while the communication control apparatus 10 having the apparatus ID "6" is in a standby state.

The operation monitoring server 110 monitors the operating state of multiple communication control apparatuses 10. When detecting any of the communication control apparatuses 10 being inoperable because of some trouble, the operation monitoring server 110 stores, in the communication control apparatus 10 on standby, the same data as stored in the inoperable apparatus, and places the standby communication control apparatus 10 in operation. For example, when the communication control apparatus 10 with the apparatus ID "2" halts the operation because of a failure, as shown in FIG. 20, the communication control apparatus 10 with the apparatus ID "6", which has been on standby, stores the data with data IDs "100001-200000" and starts operating. Thus, even if a communication control apparatus 10 stops because of some trouble, the main operation will be continued properly. The communication control apparatus 10 on standby may store any of the data in advance to be made in a hot standby state, or may be in a cold standby state.

Next, the procedure for updating databases stored in the communication control apparatuses 10 will be described. The database server 150 acquires the latest database from an external database at a certain time and retains it therein. In order to reflect, in a communication control apparatus 10, the latest database retained in the database server 150, the operation monitoring server 110 transfers the data from the database server 150 and stores it in the communication control apparatus 10 at a certain time.

FIGS. 21A, 21B and 21C are diagrams for describing the procedure for updating databases. As with FIG. 19, FIG. 21A shows that the communication control apparatuses 10 with the apparatus IDs "1"-"5" are in operation while the communication control apparatus 10 with the apparatus ID "6" is on standby. At the time when a database is to be updated, the operation monitoring server 110 identifies the communication control apparatus 10 in a standby state then and instructs the database server 150 to store the data in the communication control apparatus 10. In the example shown in FIG. 21A, the communication control apparatus 10 with the apparatus ID "6" is on standby, so that the database server 150 stores the data in that apparatus. The operation monitoring server 110 then changes the operating state field 113 for the apparatus ID "6" to "data updating".

FIG. 21B shows a state where a database of a communication control apparatus 10 is being updated. The database server 150 stores, in the first database 50 in the communication control apparatus 10 with the apparatus ID "6" on standby, the data handled by one of the communication control apparatuses 10 in operation. In the example shown in FIG. 21B, the data with data IDs "000001-100000", which have been handled by the communication control apparatus 10 with the apparatus ID "1", are stored in the communication control apparatus 10 with the apparatus ID "6".

FIG. 21C shows a state where the communication control apparatus 10 with the apparatus ID "6" has had its database updated and is placed in operation, and the communication control apparatus 10 with the apparatus ID "1" is placed into a standby state instead. Upon completion of storing data in the communication control apparatus 10 with the apparatus ID "6", the operation monitoring server 110 starts the operation of the apparatus, which stores the updated database. The operation monitoring server 110 also stops the operation of the communication control apparatus 10 with the apparatus ID "1", which stores the database before update, to place the apparatus into a standby state. Thus, the communication control apparatus 10 with an updated database is placed in operation. Then, the data with data IDs "100001-200000" are stored in the communication control apparatus 10 with the apparatus ID "1" before the apparatus is placed in operation, and, subsequently, the operation of the communication control apparatus 10 with the apparatus ID "2" is stopped. Thereafter, databases are similarly updated by turns, so that the databases of all the communication control apparatuses 10 can be updated behind the actual operation, without halting the operation of the communication control system 100.

In this way, data stored in each of the communication control apparatuses 10 is not fixed in the base technology, and hence, the communication control apparatus 10 that stores certain data changes with time. If, before a packet is sent to each of the communication control apparatuses 10, the process of determining which communication control apparatus 10 stores the data of the user is performed, the time for the process will be additionally required. Accordingly, in the present embodiment, a received packet is provided to all the communication control apparatuses 10, and each of the apparatuses then processes the packet. In the following, a technique for providing such mechanism will be described.

Figure 22:
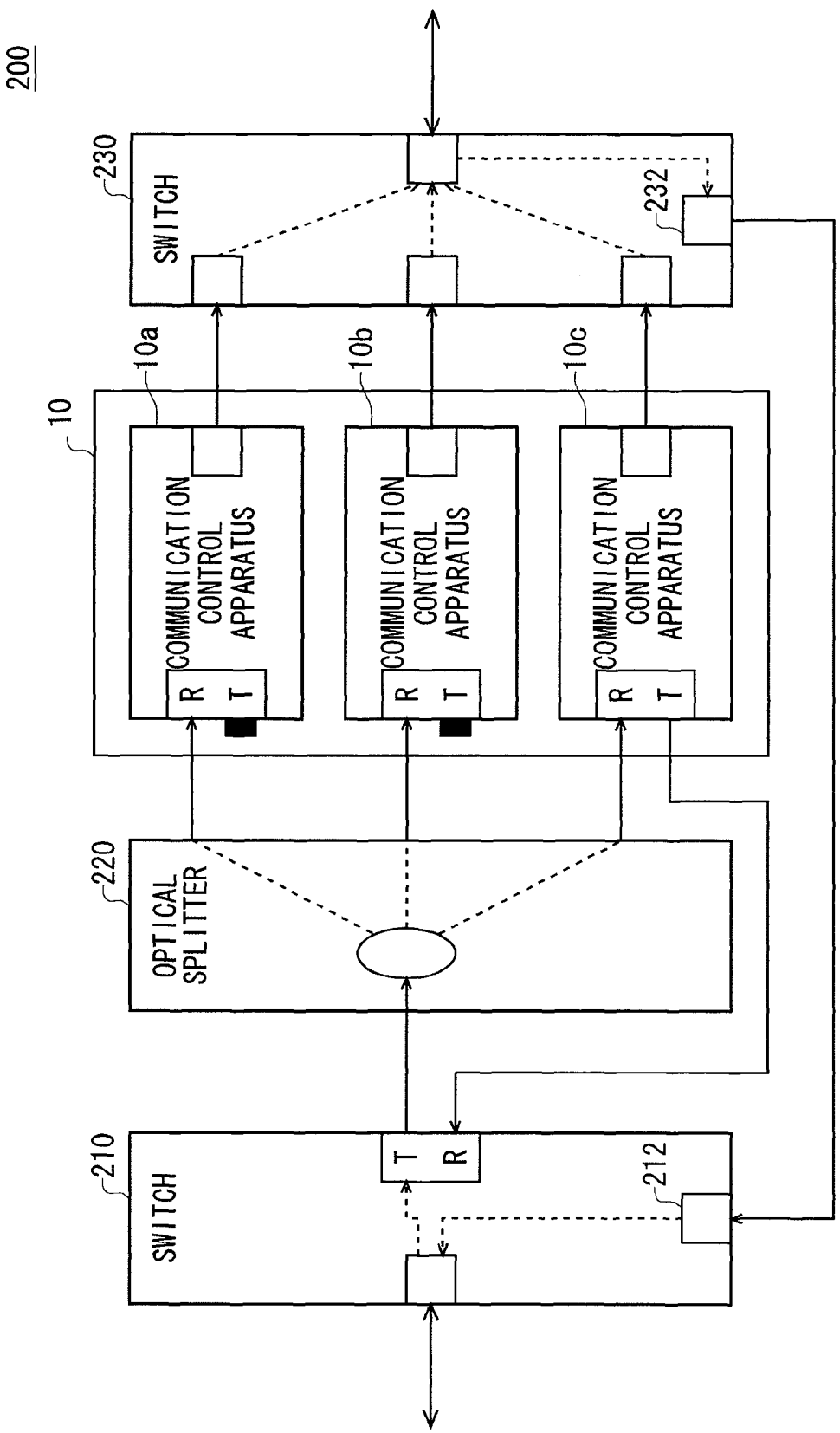
FIG. 22 is a diagram that shows a configuration of a communication path control apparatus provided to process packets with multiple communication control apparatuses.

FIG. 22 shows a configuration of a communication path control apparatus provided to process packets with multiple communication control apparatuses 10. A communication path control apparatus 200 comprises a switch 210, an optical splitter 220, which is an example of a data supply unit, and a switch 230. The switch 210 transmits a received packet to the communication control apparatuses 10. Between the switch 210 and the communication control apparatuses 10, there is provided the optical splitter 220 that provides the packet to the multiple communication control apparatuses 10a, 10b and 10c in parallel. The switch 210 practically transmits a packet to the optical splitter 220, which transmits the packet to each of the communication control apparatuses in parallel.

If a packet is converted to a broadcast packet so as to be transmitted to the multiple communication control apparatuses 10a, 10b and 10c, additional process such as adding a time stamp to the header will be required, which reduces the processing speed. Therefore, a packet is not converted but split by the optical splitter 220 so as to be transmitted as a unicast packet to the multiple communication control apparatuses 10a, 10b and 10c. This method will be called "parallelcast" in the present specification.

Each of the communication control apparatuses is not set to a mode in which an apparatus receives only packets directed to the MAC address of the apparatus, but set to promiscuous mode in which an apparatus receives all packets regardless of the destination MAC addresses. When receiving a packet sent via parallelcast from the optical splitter 220, each of the communication control apparatuses omits MAC address matching and acquires every packet to process it.

If a packet needs to be returned to the transmission source because, for example, the communication thereof has been prohibited, the communication control apparatus 10c will transmit a response packet to the switch 210 bypassing the optical splitter 220. If the communication control apparatus 10c processes the packet and the communication thereof is permitted, the communication control apparatus 10c will transmit the packet to a network. Between the communication control apparatuses 10 and the upstream communication line, there is provided the switch 230 by which packets transmitted from the multiple communication control apparatuses 10a, 10b and 10c are aggregated. The communication control apparatus 10c will practically transmit the packet to the switch 230, which transmits the packet to the upstream communication line.

When the switch 230 receives a return packet transmitted from the destination of packet transmission and if the return packet need not be processed by the communication control apparatuses 10, the packet will be transmitted from the port 232 of the switch 230 to the port 212 of the switch 210, and then transmitted therefrom to the transmission source. On the Internet, the transmission path is generally recorded in the packet to ensure the return path through which a response packet sent in return for the packet can be certainly delivered to the transmission source. In the present embodiment, however, since the return path is already provided within the communication path control apparatus 200, communication can be performed between apparatuses without recording the path or processing the packet. Consequently, unnecessary process can be eliminated, thereby improving the processing speed.

The example in FIG. 22 shows the case where only a packet transmitted from a transmission source to a transmission destination is processed, but a return packet transmitted from the transmission destination to the transmission source is made to pass through without being processed. Alternatively, the communication path control apparatus 200 may be configured so that the communication control apparatuses 10 process packets transmitted in both directions. In such case, the optical splitters 220 may be provided on both sides of the communication control apparatuses 10. Also, the bypass path from the switch 230 to switch 210 need not be provided.

In such way, by sending a packet via parallelcast to all the communication control apparatuses, the packet can be appropriately processed by the proper communication control apparatus among the multiple communication control apparatuses, without the need to specify, in advance, a communication control apparatus by which the packet is to be processed.

Since these communication control apparatuses receive all packets sent via parallelcast from the communication path control apparatus 200 to process or discard them, as stated previously, the apparatuses need not be provided with IP addresses, which uniquely identify apparatuses on the Internet. If the packet processing as discussed above is performed by server apparatuses or the likes, it will be necessary to consider attacks to the server apparatuses. However, since the communication control apparatuses of the present embodiment cannot be directly attacked by malicious third parties via the Internet, communication control can be performed securely.

Embodiment

Figure 23:
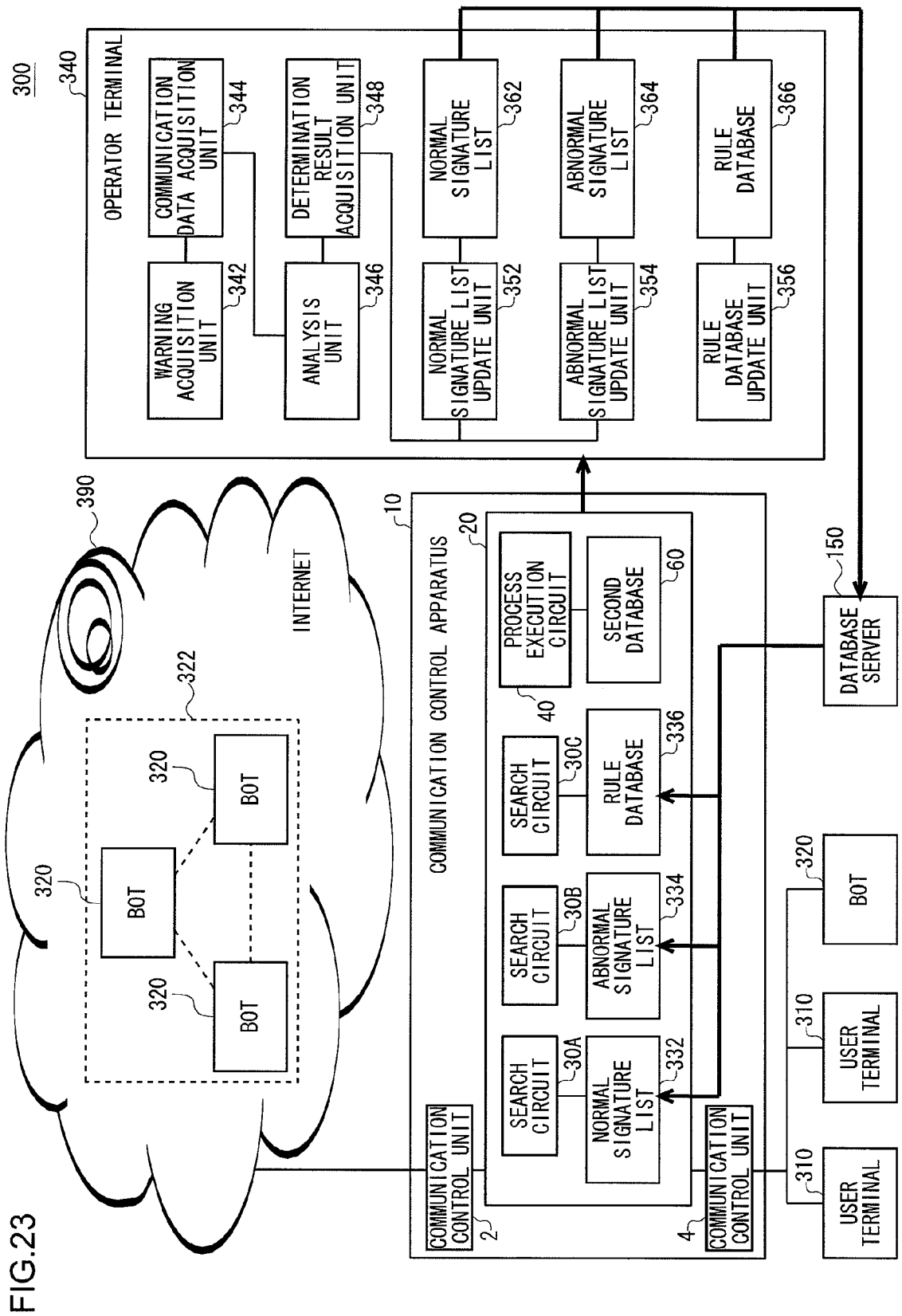
FIG. 23 is a diagram that shows a configuration of a communication management system according to an embodiment.

FIG. 23 shows a configuration of a communication management system according to the embodiment. A communication management system 300 uses the communication control apparatus 10 having a packet filtering function, etc. to perform processing for detecting and blocking inappropriate communication, such as communication for operating a bot.

As discussed previously, a bot infects and damages a user terminal 310. A user terminal infected by a bot (hereinafter, referred to as "bot 320") is operated at the attacker's discretion and behaves as the attacker's own terminal. Therefore, it is desired to detect and block communication for operating a bot 320 or communication through which a bot 320 attacks another user terminal 310.

However, since new subspecies appear constantly based on a bot of which the source code has become available, it is difficult to certainly detect every inappropriate communication data transmitted from or to a bot 320 or a botnet 322, which consists of multiple bots 320.

For such an occasion, the present embodiment proposes a technique, with the perspective reversed, in which a signature list of normal communication is created so as to permit normal communication; at the same time, every abnormal communication is reported to be analyzed, and both the signature list of normal communication and the signature list of abnormal communication are updated as needed. This technique is expected to reduce damage caused by botnets, so that the social contribution of the present invention may be considered remarkable.

In the communication management system 300, the communication control apparatus 10 is provided between a user terminal 310 and the Internet 390 to control communication data transmitted via the Internet 390. When detecting abnormal communication data, the communication control apparatus 10 notifies an operator terminal 340 thereof. The operator terminal 340 then analyzes such communication data to determine if the communication data is normal. The signature of communication data found to be normal is reflected in the communication control apparatus 10 and, thereafter, the transmission of the same kind of communication data will be permitted. The signature of communication data found to be abnormal is also reflected in the communication control apparatus 10 and, thereafter, the transmission of the same kind of communication data will be forbidden and blocked. In this way, the communication control apparatus 10 detects and blocks communication between a bot 320 and a botnet 322 or communication for operating a bot 320 via the Internet 390.

The communication control apparatus 10 of the present embodiment comprises, as the first database 50, a normal signature list 332, an abnormal signature list 334 and a rule database 336. The normal signature list 332 contains a list of signatures of communication data of which the transmission is considered to be normal and should be permitted. The abnormal signature list 334 contains a list of signatures of communication data of which the transmission is considered to be abnormal and should be blocked. The rule database 336 stores a rule for extracting communication data required to be analyzed.

Since the three first databases 50 are provided, there are also provided three search circuits 30: a search circuit 30A functions as a first search unit, which searches the normal signature list 332 storing signatures of normal communication to check if the signature of acquired communication data appears in the list; a search circuit 30B functions as a second search unit, which searches the abnormal signature list 334 storing signatures of abnormal communication to check if the signature of acquired communication data appears in the list; and a search circuit 30C functions as a third search unit, which searches the rule database 336 to check if acquired communication data complies with a rule stored in the database. At least two, or preferably all, of these search circuits 30 perform searches simultaneously in parallel. This enables fast detection of normal communication, abnormal communication, and communication to be extracted, without reducing throughput. In order to provide communication data to the three search circuits 30 concurrently, the technique shown in FIG. 22 may be used.

The second database 60 stores a processing content of issuing a warning for the case where there is detected communication data of which the signature does not match any signature of normal communication stored in the normal signature list 332. In such case, the process execution circuit 40 functions as a warning unit that, when the search circuit 30A detects communication data of which the signature does not match any signature stored in the normal signature list 332, issues a warning to notify the operator terminal 340 thereof.

The second database 60 also stores a processing content of blocking communication data for the case where there is detected communication data of which the signature matches a signature of communication to be blocked stored in the abnormal signature list 334. In such case, the process execution circuit 40 functions as a blocking unit that, when the search circuit 30B detects communication data of which the signature matches a signature stored in the abnormal signature list 334, discards and blocks the communication data.

In the operator terminal 340, when acquiring a warning from the communication control apparatus 10, a warning acquisition unit 342 notifies the operator thereof through a display output or an audio output. In the meantime, a communication data acquisition unit 344 acquires from the communication control apparatus 10 the communication data against which the warning has been issued. An analysis unit 346 analyzes communication data against which a warning has been issued and of which the signature does not match any signature of normal communication so as to determine if the communication is normal, and then transmits the result to a determination result acquisition unit 348. The determination result acquisition unit 348 may acquire the determination result from the operator who has analyzed the communication data. Alternatively, the determination result acquisition unit 348 may acquire the determination result from a security vendor or the like specified by the operator.

When acquiring a determination result that communication data against which a warning has been issued is found to be normal, the determination result acquisition unit 348 instructs a normal signature list update unit 352 to add the signature of the communication data to a normal signature list 362. The normal signature list update unit 352 then adds to the normal signature list 362 the signature of the communication data found to be normal.

When acquiring a determination result that communication data against which a warning has been issued should be blocked, the determination result acquisition unit 348 instructs an abnormal signature list update unit 354 to add the signature of the communication data to an abnormal signature list 364. The abnormal signature list update unit 354 then adds to the abnormal signature list 364 the signature of the communication data to be blocked.

The normal signature list 362 and abnormal signature list 364 thus updated are reflected, at a certain time, in the normal signature list 332 and abnormal signature list 334 of the communication control apparatus 10 by the database server 150. Updating of a database may be performed according to the procedure described in the base technology. Alternatively, the normal signature list update unit 352 and abnormal signature list update unit 354 may directly access and update the normal signature list 332 and abnormal signature list 334. When multiple communication control apparatuses 10 are provided, the database server 150 creates the normal signature list 362 that collectively contains determination results of communication data against which warnings have been issued by the respective communication control apparatuses 10, so as to reflect the collective normal signature list 362 in the normal signature lists 332 of the respective communication control apparatuses 10.

In this way, instead of only extracting the signature of abnormal communication to block the communication, the signature of normal communication alone is extracted to permit the communication; the other communication is analyzed and determined if it is normal, and the determination result is reflected thereafter. Accordingly, even though inappropriate communication is conducted using a new communication protocol in the botnet 322 or the like, the communication is not considered to be normal and can be detected certainly. Also, once communication data to be blocked is detected, the signature thereof is registered in the abnormal signature list 334 so that the communication data can be appropriately blocked thereafter. Although the number of signatures included in the normal signature list 332 and abnormal signature list 334 becomes considerably large, communication can be managed appropriately without reducing throughput, because the communication control apparatus 10 of the present embodiment is configured with dedicated hardware, and hence, high-speed search processing can be achieved, as described in the base technology.

The second database 60 further stores a processing content of replicating communication data and outputting it for the case where there is detected communication data that complies with a rule stored in the rule database 336. In such case, the process execution circuit 40 functions as an extraction unit that, when the search circuit 30C detects communication data that complies with a rule stored in the rule database 336, outputs a replica of the communication data from an output port to the operator terminal 340.

For example, when determining whether communication data against which a warning has been issued is normal or to be blocked, it may be necessary, for the analysis, to refer to other communication data transmitted from the same source or other communication data transmitted to the same destination. For such an occasion, if the IP address of the transmission source or transmission destination of the communication data against which a warning has been issued, or the content of the payload of such communication data is registered as one of the rules in the rule database 336, communication data that complies with the rule can be collected and used for the analysis. As described in the base technology, since the communication control apparatus 10 of the present embodiment can detect not only information stored in a header field, such as the IP address of a transmission source or a transmission destination, but also information stored in a payload field, the rules can be set in more detail.

If the operator decides that communication data against which a warning has been issued should be analyzed with reference to other communication data, the operator may add a rule for extracting relevant communication data to a rule database 366 via a rule database update unit 356. The updated rule database 366 is reflected in the rule database 336 of the communication control apparatus 10 by the database server 150. This enables a packet capture apparatus that can modify a signature as needed.

The present invention has been described with reference to the embodiment. The embodiment is intended to be illustrative only and it will be obvious to those skilled in the art that various modifications to constituting elements or processes could be developed and that such modifications are also within the scope of the present invention.

Although the normal signature list 332, abnormal signature list 334, rule database 336, and the search circuits 30A, 30B and 30C, which search such lists and database for communication data, are provided in a single communication control apparatus 10 in the present embodiment, these may be provided in different communication control apparatuses 10.

INDUSTRIAL APPLICABILITY

The present invention is applicable to a communication management system that manages inappropriate communication.

The invention claimed is:

1. A communication control apparatus including a communication control unit, a process execution circuit, and a plurality of search circuits, comprising:
   a normal signature list which stores a list of signatures of normal communication to be permitted;
   an abnormal signature list which stores a list of signatures of communication to be blocked;
   a first of said search circuits which acquires communication data and searches the normal signature list storing signatures of normal communication to be permitted to check if the signature of the communication data appears in the normal signature list;
   a second of said search circuits which acquires communication data and searches the abnormal signature list storing signatures of communication to be blocked to check if the signature of the communication data appears in the abnormal signature list;
   said process execution circuit which passes a communication data when the signature of the communication data appears in the normal signature list storing a list of signatures of normal communication to be permitted;
   a warning circuit which issues a warning when there is detected communication data of which the signature does not match any signatures of normal communication stored in the normal signature list;
   a blocking circuit which, when there is detected communication data of which the signature matches a signature of communication to be blocked stored in the abnormal signature list, blocks the communication data;
   an analysis circuit which generates a determination result indicating whether or not communication data against which a warning has been issued is normal and a determination result indicating whether or not communication data against which a warning has been issued should be blocked, when the first search circuit detects that the communication data does not match any signatures of normal communication stored in the normal signature list and when the second search circuit detects that the communication data does not match any signatures of communication to be blocked stored in the abnormal signature list, as the communication data is sent or received by a terminal infected by a bot;
   a determination result acquisition unit which acquires, from the analysis circuit, a determination result indicating whether or not communication data against which a warning has been issued is normal and a determination result indicating whether or not communication data against which a warning has been issued should be blocked as the communication data is sent or received by a terminal infected by a bot;
   a normal signature list update unit which, when the determination result acquisition unit acquires a determination result that communication data against which a warning has been issued is found to be normal, adds the signature of the communication data to the normal signature list;
   an abnormal signature list update unit which, when the determination result acquisition unit acquires a determination result that communication data against which a warning has been issued should be blocked, adds the signature of the communication data to the abnormal signature list;
   a rule database which stores IP address of a transmission source, transmission destination or content of a part of the communication data required to be analyzed for constituting a modifiable signature as one of rules among acquired communication data;
   a third of said search circuits which acquires communication data and searches the rule database to check if the communication data complies with a rule stored in the database; and
   an extraction unit which, when there is detected communication data complying with a rule stored in the rule database, extracts the communication data;
   wherein at least two of the first search circuit, the second search circuit and the third search circuit perform searches simultaneously in parallel.

2. The communication control apparatus of claim 1, further comprising a rule database update unit which adds, to the rule database, a rule for extracting communication data associated with communication data against which a warning has been issued.

3. The communication control apparatus of claim 1, wherein at least one of the first search circuit, the second search circuit and the third search circuit is configured with a wired logic circuit.

4. The communication control apparatus of claim 1, further comprising an operation monitoring server for managing the operating state of multiple search circuits.

* * * * *